United States Patent [19]

Smith

[11] Patent Number: 5,412,197
[45] Date of Patent: May 2, 1995

[54] METHOD AND APPARATUS FOR DECODING BAR CODE SYMBOLS USING GRADIENT SIGNALS

[75] Inventor: Christopher E. Smith, Newtown, Conn.

[73] Assignee: United Parcel Service of America, Inc., Atlanta, Ga.

[21] Appl. No.: 280,576

[22] Filed: Jul. 26, 1994

Related U.S. Application Data

[63] Continuation of Ser. No. 11,459, Jan. 29, 1993, abandoned.

[51] Int. Cl.⁶ .............................................. G06K 7/10
[52] U.S. Cl. ................................. 235/462; 235/463
[58] Field of Search ............................... 235/462, 463

[56] References Cited

U.S. PATENT DOCUMENTS

| | | |
|---|---|---|
| 4,749,879 | 6/1988 | Peterson et al. |
| 4,873,426 | 10/1989 | Sarna et al. |
| 4,958,064 | 9/1990 | Kirkpatrick |
| 4,973,829 | 11/1990 | Ishida et al. |
| 4,988,852 | 1/1991 | Krishnan |
| 4,992,650 | 2/1991 | Somerville |
| 5,036,182 | 7/1991 | Ouchi et al. |
| 5,045,677 | 9/1991 | Okamura |
| 5,073,954 | 12/1991 | Van Tyne et al. |
| 5,081,689 | 1/1992 | Meyer et al. |
| 5,120,940 | 6/1992 | Willsie |
| 5,142,592 | 8/1992 | Moler |
| 5,155,343 | 10/1992 | Chandler et al. |
| 5,155,344 | 10/1992 | Fardeau et al. |

*Primary Examiner*—Harold Pitts
*Attorney, Agent, or Firm*—Steve Mendelsohn; William H. Murray

[57] ABSTRACT

A bar code reader decodes a bar code symbol in a pixel image by transforming the data corresponding to the symbol along a first scan line, where the transformation comprises rotation and stretching. The reader generates a whitening gradient vector, a blackening gradient vector, and a count vector from the transformed data. The reader then transforms (by rotating and stretching) another set of data corresponding to the symbol along a second scan line. The reader updates the whitening and blackening gradient vectors and the count vector using the second set of transformed data. The reader then generates whitening and blackening gradient signals from the whitening and blackening gradient vectors and the count vector. The reader segments the whitening and blackening gradient signals and generates a single one-dimensional reconstructed signal based on the weighted centroids of the two segmented gradient signals. The reader then decodes the symbol by decoding the reconstructed signal.

36 Claims, 15 Drawing Sheets

104

112

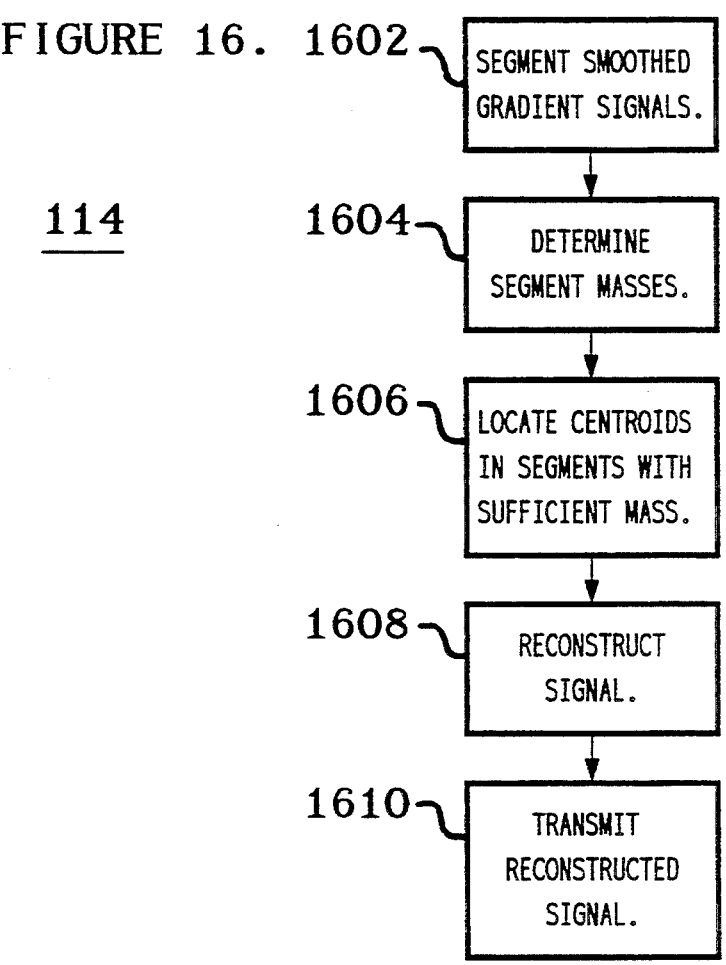

METHOD AND APPARATUS FOR DECODING BAR CODE SYMBOLS USING GRADIENT SIGNALS

This is a continuation of application Ser. No. 08/011,459 filed on Jan. 29, 1993, now abandoned.

BACKGROUND OF THE INVENTION

1. Field of the Invention

The present invention relates to image processing, and, in particular, to a method and apparatus for locating and decoding bar code symbols in pixel images.

2. Statement of Related Art

Reading bar code symbols with one-dimensional laser scanning systems is well known. Less well known are image processing systems for locating and decoding bar code symbols in two-dimensional pixel images. Decoding bar code symbols requires accurate measurement of edge-to-edge distances, where an edge corresponds to a transition from a bar to a space or from a space to a bar within a bar code symbol.

Of particular difficulty is the reading of high-density bar code symbols in facsimile-quality images, that is, images of bar code symbols generated by facsimile machines and the like. A bar code reader that can locate and decode bar code symbols in an image generated by a facsimile machine should be able to be adapted to read bar code symbols in an image generated by any other image source such as a scanner or a camera.

SUMMARY OF THE INVENTION

In a preferred embodiment, the present invention is a method and apparatus for reading a bar code symbol in a pixel image. According to this embodiment, a first signal representative of the dark-to-bright transitions in the symbol is generated. A second signal representative of the bright-to-dark transitions in the symbol is also generated. The symbol is then decoded in accordance with the first and second signals.

In an alternative preferred embodiment, the present invention is a method and apparatus for reading a bar code symbol in a pixel image. According to this embodiment, the symbol is transformed by rotating the symbol to an angle substantially parallel to either a row or column of pixels in the image and stretching the symbol. A first scan line substantially perpendicular to the bars and spaces of the transformed symbol is selected. Whitening and blackening gradient signals are then generated in accordance with the first scan line. The symbol is then decoded in accordance with the whitening and blackening gradient signals.

In another alternative preferred embodiment, the present invention is a method and apparatus for reading a bar code symbol in a pixel image. According to this embodiment, a whitening gradient signal corresponding to the bar code symbol is received and the whitening gradient signal is segmented into at least one whitening segment. A first location in the whitening segment corresponding to a dark-to-bright transition is then selected. A blackening gradient signal corresponding to the bar code symbol is also received and the blackening gradient signal is segmented into at least one blackening segment. A second location in the blackening segment corresponding to a bright-to-dark transition is then selected. The symbol is then decoded in accordance with the first and second locations.

BRIEF DESCRIPTION OF THE DRAWINGS

FIG. 16 is a block flow diagram of the processing implemented by the gradient signal processor of the system of FIG. 1 to process whitening and blackening gradient signals.

DETAILED DESCRIPTION OF THE INVENTION

Figure 1:
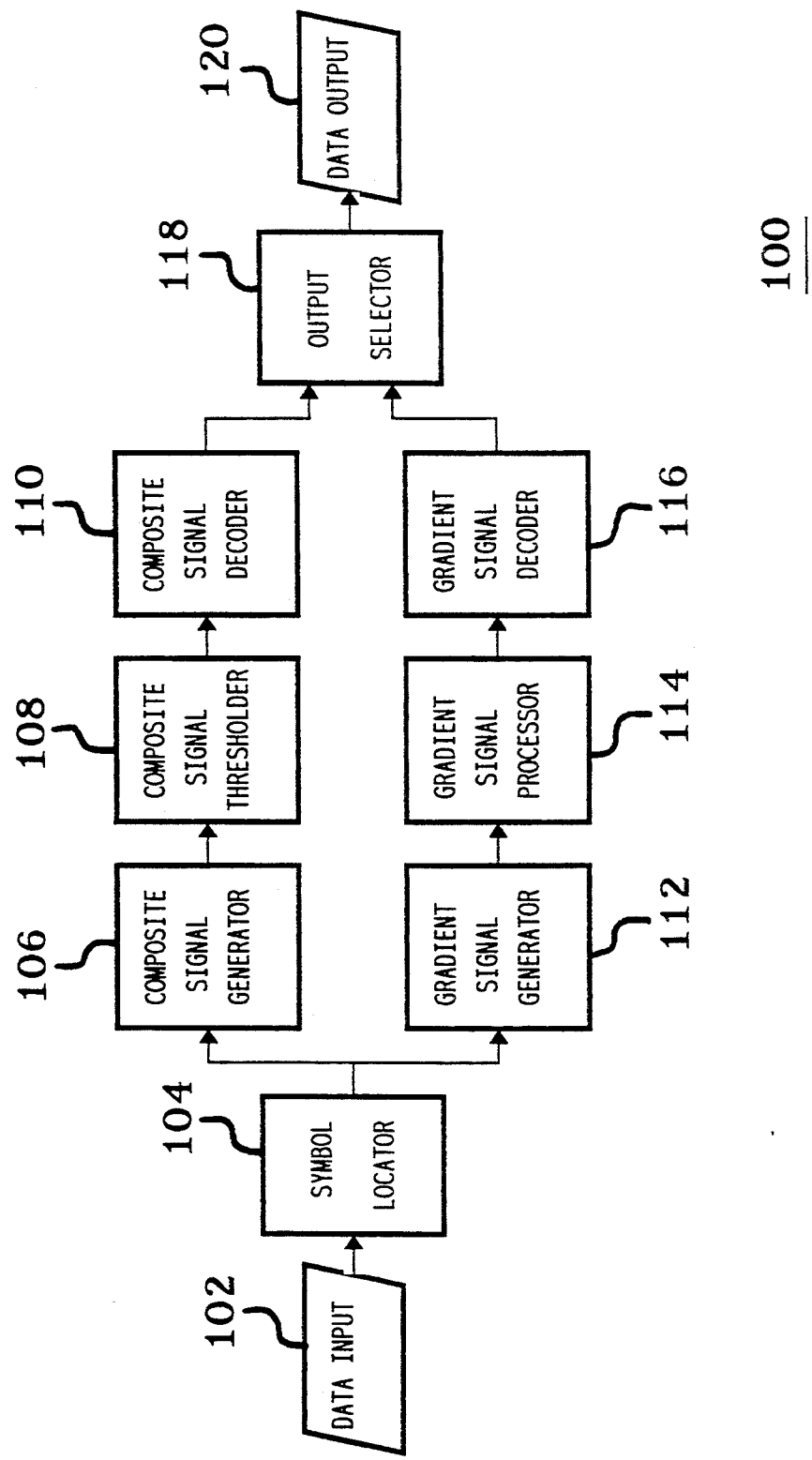
FIG. 1 is a functional block diagram of a bar code symbol reading system according to preferred embodiment of the present invention.

Referring to FIG. 1, there is shown a functional block diagram of bar code symbol reading system 100 according to a preferred embodiment of the present invention. System 100 locates and decodes bar code symbols with unknown positions and orientations in two-dimensional pixel images. System 100 may be designed to locate and decode bar code symbols in either binary images or gray-scale images.

Data input 102 of system 100 receives the data for a pixel image and symbol locator 104 locates bar code symbols contained in the pixel image. System 100 preferably attempts to decode each located bar code symbol in the pixel image by two parallel processes.

According to one process, composite signal generator 106 generates a composite signal corresponding to the bar code symbol. Composite signal thresholder 108 then thresholds and filters the composite signal to generate a binary signal corresponding to the composite signal. Composite signal decoder 110 then decodes the bar code symbol by decoding the binary signal. If signal decoder 110 successfully decodes the bar code symbol, decoder 110 transmits the decoded signal to output selector 118. Otherwise, signal decoder 110 transmits a signal to output selector 118 indicating that the decoding was unsuccessful.

According to the other process for decoding each located bar code symbol, gradient signal generator 112 generates two gradient signals from the located bar code symbol. Gradient signal processor 114 processes the two gradient signals to generate a binary reconstructed signal. Gradient signal decoder 116 then decodes the bar code symbol by decoding the reconstructed signal. If signal decoder 116 successfully decodes the bar code symbol, decoder 116 transmits the decoded signal to output selector 118. Otherwise, signal decoder 116 transmits a signal to output selector 118 indicating that the decoding was unsuccessful.

In a preferred embodiment, composite signal decoder 110 and gradient signal decoder 116 perform identical decoding algorithms on the binary signals received from composite signal thresholder 108 and gradient signal processor 114, respectively.

Output selector 118 receives the decoded signals from signal decoders 110 and 116 and selects the appropriate output for transmission to data output 120. If either or both of signal decoders 110 and 116 successfully decode the bar code symbol, then output selector 118 transmits the decoded signal to data output 120. Otherwise, the bar code symbol was not decoded and output selector 118 transmits an appropriate signal to data output 120.

Locating Bar Code Symbols

Figure 2:
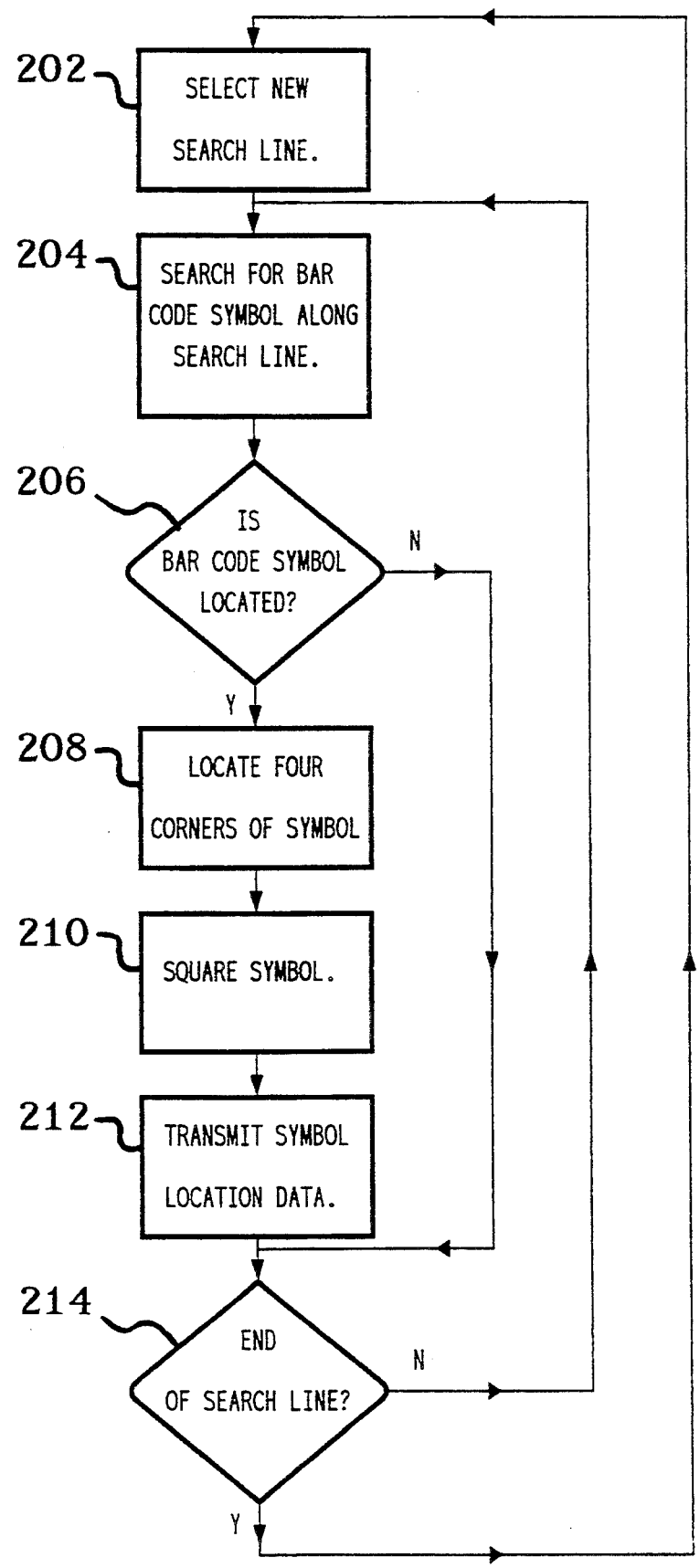
FIG. 2 is a block flow diagram of processing implemented by the symbol locator of the system of FIG. 1 to locate bar code symbols in a pixel image.

Referring now to FIG. 2, there is shown a block flow diagram for the processing implemented by symbol locator 104 of system 100. Symbol locator 104 locates a bar code symbol in a pixel image by searching for a bar code symbol quiet zone that is followed by a minimum number of transitions between symbol bars and spaces. On each end of a bar code symbol in a pixel image is a region of bright pixels called a quiet zone. The symbol itself is comprised of a sequence of dark bars separated by bright spaces.

According to a preferred embodiment, means 202 of symbol locator 104 selects a new search line in the pixel image. A search line may be either a row or column of the pixel image. Means 202 may select search lines employing a binary search such as that described U.S. Patent application Ser. No. 07/927,910, entitled "Method and Apparatus for Detecting and Decoding Bar Code Symbols," filed on Aug. 10, 1992, now U.S. Pat. No. 5,343,028, which is commonly owned by the present assignee and the disclosure of which is incorporated herein in its entirety by reference. A suitable system for selecting search lines using a binary search is described in the section of the '910 application entitled "Detecting and Decoding Bar Code Symbols." In general, since a bar code symbol typically spans multiple rows and columns in the pixel image, means 202 preferably selects rows in a sequence employing a broad pattern that gets finer as processing proceeds.

Table I presents a preferred sequence for selecting rows (or analogously columns) in a pixel image having, for example, 2048 columns and 4096 rows. In the preferred sequence, the selection of rows as search lines starts at row number 64 with a step size of 64. After selecting rows (64, 128, 192, . . . , 4032, 4096), the sequence returns to row number 32 with the same 64-row step size. The selection continues as indicated in Table I. After selecting rows (4, 12, 20, . . . , 4084, 4092), the entire sequence will have selected every fourth row in the image without repeating any row twice.

TABLE I

| Row Step size | Starting Row Number | Sequence of Rows |
|---|---|---|
| 64 | 64 | (64, 128, . . ., 4096) |
| 64 | 32 | (32, 96, . . ., 4064) |
| 32 | 16 | (16, 48, . . ., 4080) |
| 16 | 8 | (8, 24, . . ., 4088) |
| 8 | 4 | (4, 12, . . ., 4092) |

A sequence of selecting search rows such as that in Table I typically increases the speed and efficiency of system 100. Those skilled in the art will understand that such a sequence may be varied depending on the characteristics of the pixel images to be processed.

In a preferred embodiment, if the pixel image contains a known number of bar code symbols, the search sequence is terminated after the requisite number of bar code symbols have been located and decoded. In addition, system 100 preferably keeps track of the areas of the image that contain bar code symbols that have already been located and decoded. Symbol locator 104 preferably ignores those areas that have already been processed.

Means 204 begins searching along a selected search line for a candidate (or potential) bar code symbol from a starting edge of the pixel image. Where the bar code symbols expected to be found in the pixel image have a known minimum length, means 204 preferably does not search the entire length of each selected search line. Since system 100 decodes only "whole" bar code symbols, means 204 preferably ignores a portion of each selected search line adjacent to the stopping edge of the search line. The portion of each search line that is ignored corresponds in distance to the shortest expected bar code symbol.

Means 204 recognizes a candidate bar code symbol as a continuous sequence of N1 "bright" pixels (corresponding to an expected quiet zone) followed by a sequence of N2 transitions between "bright" and "dark" pixels (corresponding to transitions between expected bars and spaces), where N1 and N2 are first and second specified thresholds, respectively.

Means 204 may search for candidate bar code symbols in either binary or gray-scale images. In binary images, bright pixels may be defined to have a value of 1 and dark pixels may be defined to have a value of 0. In gray-scale images, a pixel having a value greater than a third threshold may be defined to be a bright pixel; otherwise, it is a dark pixel.

Means 204 functions by first searching for a candidate bar code symbol quiet zone. Means 204 detects a candidate bar code symbol quiet zone when it finds a continuous sequence of N1 bright pixels along the selected search line. Once a candidate bar code symbol quiet zone has been detected, means 204 next searches along the selected search line for a sequence of N2 bright-/dark transitions, where each bright/dark transition corresponds to an edge of a bar in the candidate bar code symbol (i.e., a transition between a bar and a space of the symbol). The term "bright/dark transition" refers collectively to both bright-to-dark transitions and dark-to-bright transitions.

After locating the first dark pixel following a candidate quiet zone, means 204 checks whether that dark pixel is contained in a bar code symbol that has already been located and decoded by system 100. If so, then the candidate bar code symbol is rejected, since it has already been processed.

In addition, while counting the number of bright-/dark transitions, means 204 checks the width of each candidate bar and space. If any candidate bar/space is too wide (i.e., exceeds a specified maximum bar/space threshold), then the candidate symbol is rejected and a new search for a candidate bar code symbol quiet zone is started.

After locating a candidate bar code symbol along a selected search line (i.e., after locating a candidate quiet zone followed by a minimum number of candidate bars and spaces), means 204 verifies the candidate symbol by repeating the quiet-zone searching and bar/space transition counting along one or more neighboring rows/-columns in the pixel image.

Byte-Based Searching of Binary Images

Figure 3:
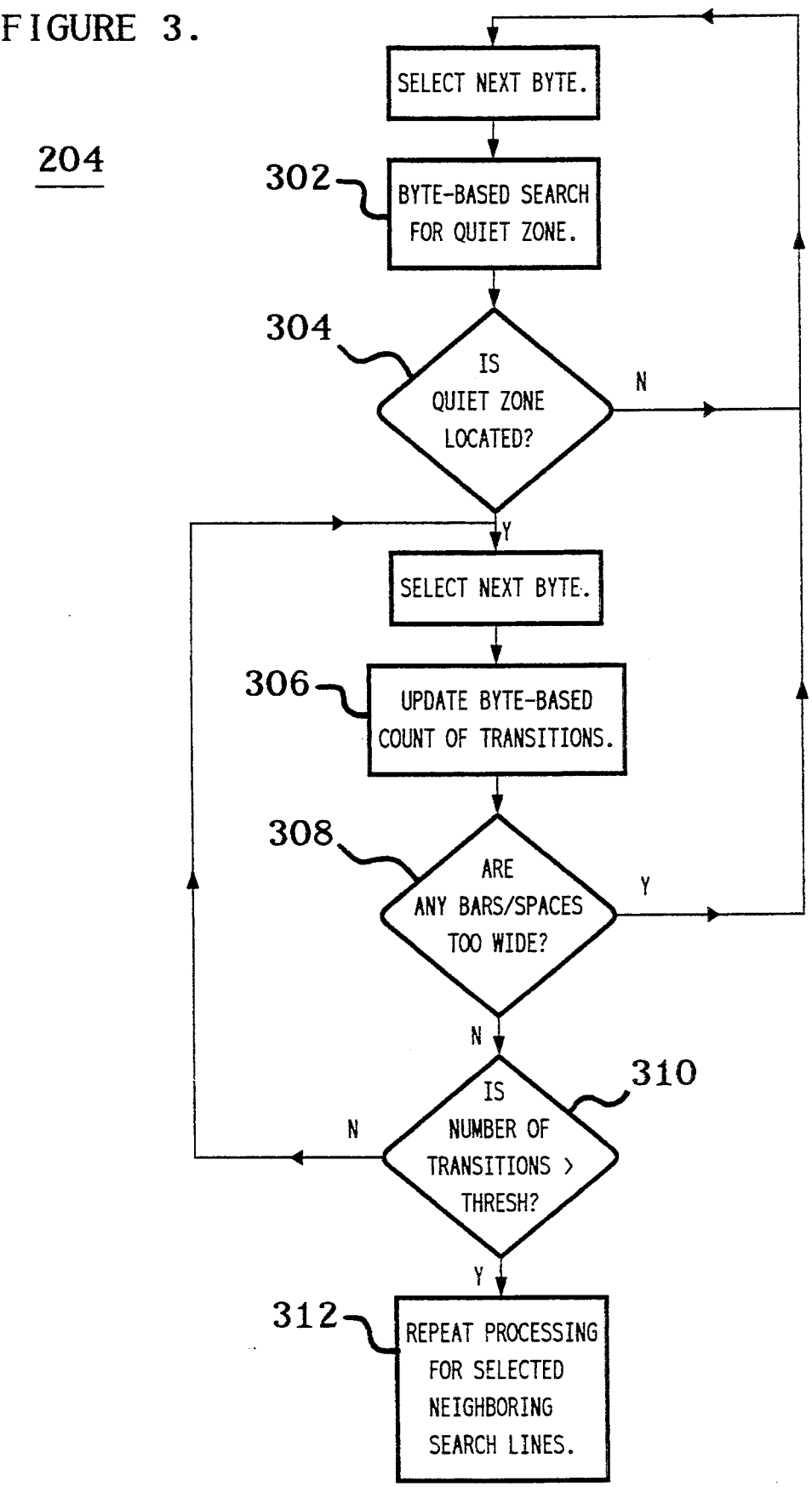
FIG. 3 is a block flow diagram of processing implemented by the symbol locator of FIG. 2 to locate candidate bar code symbols in binary images.

Referring now to FIG. 3, there is shown a block flow diagram of the processing implemented by means 204 of symbol locator 104 to locate candidate bar code symbols when the pixel image is a binary image. In a binary image, each pixel is represented by a single bit, where, for example, a "1" corresponds to a bright pixel and a "0" corresponds to a dark pixel. In a preferred embodiment, means 204 performs byte-based searching for quiet zones and byte-based counting of bar/space transitions, where eight consecutive binary pixels in the pixel image are treated as a single byte of image data.

Means 302 searches along the selected search line one byte at a time. A byte corresponding to eight pixels all of which are located in a candidate quiet zone will typically have all eight bits (i.e., pixels) equal to 1. Thus, if the minimum quiet zone length is equivalent to 32 pixels, then a search line through a quiet zone will have at least three consecutive bytes that are all 1's. If means 302 detects three consecutive quiet-zone bytes (i.e., all 1's), then a candidate quiet zone is located and means 304 directs processing to continue to means 306. Otherwise, processing returns to means 302 to continue byte-based searching for a candidate quiet zone.

Means 306 performs byte-based counting of bar/space transitions in the candidate bar code symbol. Each byte that represents bars and spaces in a candidate bar code symbol provides specific information regarding the number of bright/dark transitions in a portion of the symbol. For example, the byte "01100110" contains four transitions—two from dark to bright (i.e., from 0 to 1) and two from bright to dark (i.e., from 1 to 0). Moreover, if the last bit from the previous byte was "1," then a bright-to-dark transition exists between the previous byte and the current byte. Similarly, if the first bit in the next byte is a "1," then a dark-to-bright transition exists between the current byte and the next byte.

Means 306 preferably employs two look-up tables to perform byte-based counting of bar/space transitions—one table is used when the previous pixel (i.e., the last bit in the previous byte) is a "1" and the other table is used when the previous pixel is a "0." Each table has 256 entries, one for every possible combination of pixels in an eight-bit byte.

Each entry in each table represents three values: (a) the number of lead (left-most) pixels that are the same "color" (i.e., black or white) as the previous pixel, (b) the number of trailing (right-most) pixels (including the last pixel) that are the same color as the last pixel in the byte, and (c) the number of transitions within the eight-pixel byte (including any transition from the previous pixel).

For example, in the (previous pixel=1) table, the byte "01100110" has (a) "0" as the number of lead pixels that are the same color as the previous pixel, (b) "1" as the number of trailing pixels that are the same color as the last pixel, and (c) "5" as the number of transitions within the byte. In the (previous pixel=0) table, the byte "01100110" has (a) "1" as the number of lead pixels that are the same color as the previous bit, (b) "1" as the number of trailing pixels that are the same color as the last pixel, and (c) "4" as the number of transitions within the byte.

Means 306 uses the values derived from the table entries to count the number of transitions and to determine the size of each bar and space. Means 306 keeps a running count of the number of transitions as it processes each sequence of image bytes along a selected search line. Means 306 also determines whether any bar or space exceeds specified thresholds by keeping a running count of the size of the current bar/space. Means 306 performs these computations using the information derived from the two tables.

For example, assume that a sequence of image bytes along a selected search line is ("00011011", "01101101", "11001100", "00000111"). Assume further that the previous pixel for the first byte in the sequence was "0". After the first byte, the running count of the number of transitions is 3. The second byte adds another 6 transitions to the running count, for a total of 9. The third byte adds another 3 transitions, for a total of 12. The fourth byte adds another 1 transition, for a total of 13.

As each byte is processed, means 308 determines whether any bar or space is too wide by continuously incrementing and monitoring a current bar/space size counter. For any given pixel along a selected search line, this size counter represents the number of consecutive pixels sharing the same color as the given pixel and which also immediately precede the given pixel along the search line. If a bar/space width is greater than a specified maximum bar/space width (i.e., if the size counter exceeds a specified threshold), then the candidate symbol is rejected and means 308 directs processing to return to means 302 to restart byte-based searching for a candidate quiet zone. Otherwise, processing continues to means 310.

Referring again to the exemplary sequence of image bytes described two paragraphs above, when the color changes from bright to dark in between the end of the first byte and the beginning of the second byte, the current bar/space size counter is reset to zero at this point along the search line. When the fourth byte is processed, the number of trailing pixels of the same color (2) from the third byte is increased by the number of leading pixels of the same color as the previous pixel (5) to yield a current bar/space size of 7 pixels.

If, in a particular application, the specified maximum bar/space width is greater than five pixels, then the preceding discussion applies. If, however, the specified maximum bar/space width is five pixels or less, then special processing may be required. For example, if the maximum bar width is five pixels, then the byte "10000001" would correspond to a bar six pixels wide. Those skilled in the art will understand that this situation may be handled by manipulating the entries in the two tables for that byte. For example, if the numbers of leading pixels of the same color as the previous pixel stored in both tables for byte "10000001" were stored as six, then the processing described above would handle this particular situation.

As each byte is processed, means 310 determines whether the running count of the number of transitions exceeds a specified threshold, for example, 30. If so, then a candidate bar code symbol is recognized and processing continues to means 312; otherwise, processing returns to means 306 to continue the byte-based counting of transitions.

Processing reaches means 312 when a candidate bar code symbol is recognized. Means 312 verifies the candidate symbol by repeating the byte-based quiet-zone searching and transition counting of means 302 through means 310 along selected neighboring search lines. Means 312 preferably selects three parallel neighboring search lines on each side of the original search line.

When the original search line is an image row, the neighboring search lines are preferably every second or third row. For example, if row 40 is the original search line, means 312 may select rows 31, 34, 37, 43, 46, 49 as the six neighboring search lines.

Means 312 functions by first identifying the pixel along the original search line that corresponds to the start of the candidate symbol. This pixel is the first dark pixel following the candidate quiet zone. Based on this first dark pixel, means 312 selects a starting column in the pixel image for each neighboring search line. Where searching is performed along search lines from left to right, the starting column is located left of the first dark pixel by a distance equivalent to the length of at least two minimum quiet zones. For example, if the first dark pixel along the original search line is at column 1000 and if the minimum size of a quiet zone is 32 pixels, then means 312 will begin searching at column 936 in each neighboring search line.

Similarly, means 312 selects the ending column for each neighboring search line by moving from the first dark pixel to the right by a distance equivalent to the length of the maximum expected bar code symbol plus two minimum quiet zones. Continuing with the previous example, if the maximum symbol length is 300 pixels, then means 312 will end searching at column (1000+300+64) or 1364 of each neighboring search line. In a preferred embodiment, a candidate bar code symbol is verified if at least three of the six neighboring search lines contain the same candidate symbol. For a neighboring search line to contain the same candidate symbol, the first black pixel in the neighboring search line must be at a column within one-half of a minimum quiet zone from the column that contained the first black pixel along the original search line.

Those skilled in the art will understand that means 312 makes analogous selections when search lines are columns. It will also be understood that this preferred process of selecting neighboring search lines is designed to process images having bar code symbols of random orientation. Those skilled in the art will recognize that byte-based quiet-zone searching and transition counting can be implemented in systems having other than eight bits (i.e., pixels) per byte.

Referring again to FIG. 2, if a bar code symbol is located and verified, means 206 of symbol locator 104 directs processing to corner locator 208; otherwise, processing continues to means 214.

The particular embodiment of byte-based searching for bar code symbols in pixel images described in this section of this specification pertains to the processing of only binary pixel images. Those skilled in the art will understand that all other features of system 100 disclosed in this specification pertain to the processing of either binary or gray-scale pixel images.

Locating Corners of a Bar Code Symbol

Corner locator 208 of symbol locator 104 locates the four corners of a bar code symbol located by means 204. Corner locator 208 receives from means 206 the coordinates of the first dark pixel along the original search line and implements a corner-finding algorithm. In a preferred embodiment, the corner-finding algorithm implemented by locator 208 is similar to that described in the section entitled "Locating the Four Corners of a Bar Code Symbol" and the three sections that immediately follow that section in U.S. patent application Ser. No. 07/927,910, the disclosure of which is incorporated herein in its entirety by reference.

Figure 4:
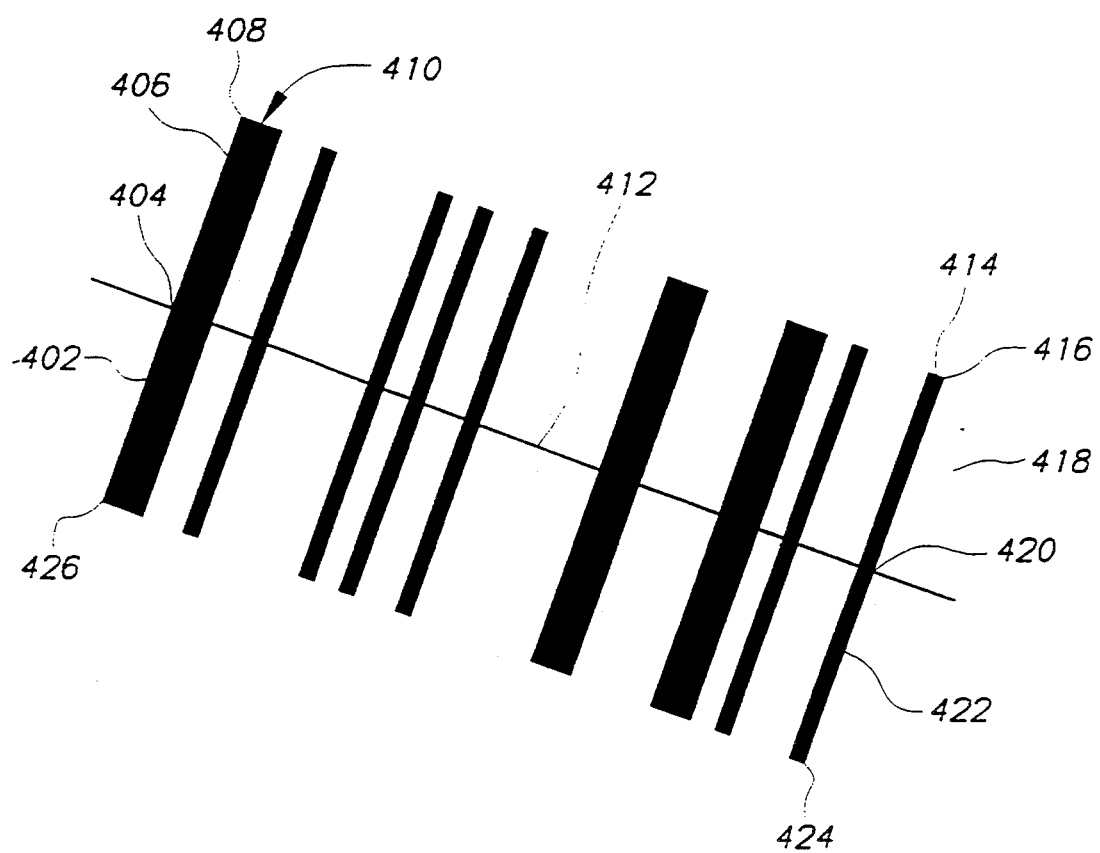
FIG. 4 is an image of a bar code symbol located by the symbol locator of FIG. 2.

Referring now to FIG. 4, there is shown an image of bar code symbol 400 located by means 204, where pixel 402 is the first dark pixel along the original search line. Briefly put, the corner-finding algorithm described in U.S. patent application Ser. No. 07/927,910 comprises the following steps:

(1) "Crawling" clockwise along outside edge 406 of leading bar 410 of bar code symbol 400 from first dark pixel 402 until the end of bar 410 is detected. The end of a bar is detected as a change in the crawling direction greater than a specified threshold. Such a change corresponds to crawling around a corner rather than along a line. This step locates upper left-hand corner 408 of symbol 400;

(2) Crawling counter-clockwise along leading bar 410 to locate lower left-hand corner 426 of symbol 400;

(3) Projecting perpendicular line 412 from center pixel 404 of leading bar 410 across symbol 400, as determined from corners 408 and 426;

(4) Searching along perpendicular line 412 from left to right starting at center pixel 404 for quiet zone 418 at the far end of symbol 400;

(5) Searching along perpendicular line 412 from right to left starting in quiet zone 418 for last dark pixel 420 at the far end of symbol 400;

(6) Crawling counter-clockwise along outer edge 422 of trailing bar 414 to locate upper right-hand corner 416 of symbol 400; and (7) Crawling clockwise along trailing bar 414 to locate lower right-hand corner 424 of symbol 400.

In addition to these seven steps of the corner-finding algorithm disclosed in the '910 application, corner locator 208 preferably verifies the accuracy of the located corners by performing the following additional steps, not disclosed in the '910 application:

(8) Verifying that the line segment defined by first dark pixel 402 and corner 408 and the line segment defined by first dark pixel 402 and corner 426 are sufficiently co-linear;

(9) Verifying that the line segment defined by last dark pixel 420 and corner 416 and the line segment defined by last dark pixel 420 and corner 424 are sufficiently co-linear; and

(10) Verifying that the line segment defined by corners 408 and 426 and the line segment defined by corners 416 and 424 are sufficiently parallel.

The candidate bar code symbol is rejected if the relevant line segments in steps (8), (9), or (10) are not sufficiently parallel. Two line segments are sufficiently parallel if the difference between their slopes is within a specified threshold. Since the relevant line segments of steps (8) and (9) share a common point (i.e., first dark pixel 402 and last dark pixel 420, respectively), the test for parallelism is equivalent to the test for co-linearity. In a preferred embodiment, corner locator 208 determines the (row, column) coordinates in the pixel image of the four located corners 408, 426, 416, and 424 of bar code symbol 400.

"Squaring" the Located Symbol

After corner locator 208 locates four corners for the bar code symbol, means 210 corrects the location of at least one of the four corners. The four corners selected by corner locator 208 define a quadrilateral. However, a bar code symbol is ideally defined by a rectangle—a particular type of quadrilateral. For one or more reasons, the quadrilateral defined by the four corners identified by corner locator 208 may not be a rectangle.

For example, if the leading or trailing bar is broken into two or more segments in the image, one side of the located quadrilateral may be shorter than the opposite side. Line noise in the transmission of a run-length-encoded facsimile may result in such breaks in the bars. Such line noise may also result in extensions to the bars. In either case, the location of corners may be inaccurate. Alternatively, the actual label containing the imaged bar code symbol may be physically degraded such that the bars are not complete.

Figure 5:
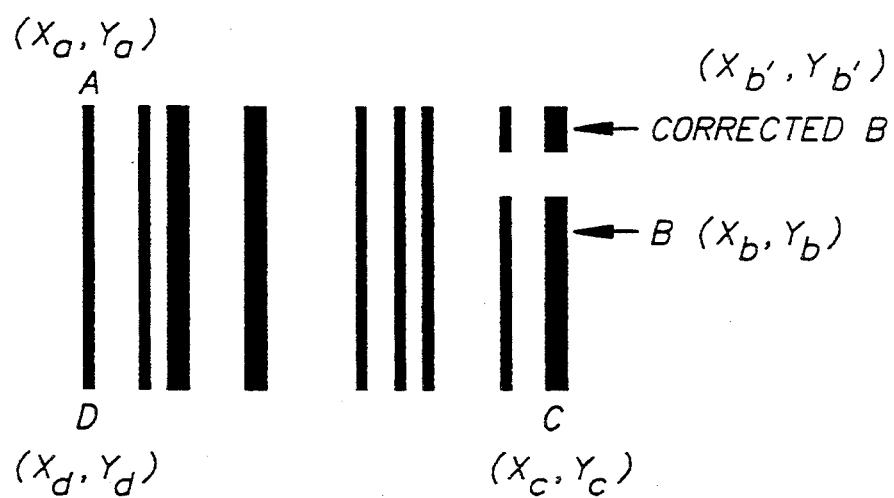
FIG. 5 is an image of a bar code symbol in which the trailing bar is broken into two segments.

Referring now to FIG. 5, there is shown an image of a bar code symbol in which the trailing bar is broken into two segments. Corner locator 208 locates corners A, B, C, and D having coordinates (Xa, Ya), (Xb, Yb), (Xc, Yc), and (Xd, Yd), respectively. Means 210 corrects the location of at least one of the located corners by constructing the "best" rectangle based on at least two of the other four located corners.

For each of the four corners, means 210 computes an error value E. For example, for corner B, the error value Eb is determined by:

$$Eb = |AC^2 - (AB^2 + BC^2)| \qquad (1)$$
$$= |[(Xc - Xa)^2 + (Yc - Ya)^2] -$$
$$[(Xb - Xa)^2 + (Yb - Ya)^2] -$$
$$[(Xc - Xb)^2 + (Yc - Yb)^2]|,$$

where AC is the distance between corners A and C, AB is the distance between corners A and B, and BC is the distance between corners B and C. The greater the deviation from a ninety-degree right angle at corner B, the greater the error value Eb. Using similar equations, means 210 also calculates error values Ea, Ec, and Ed for corners A, C, and D, respectively.

Means 210 selects the corner with the greatest error as the corner to correct. For the symbol of FIG. 5, error value Eb is the greatest of the four error values and means 210 selects corner B for correction. The corrected location for corner B may be defined by those coordinates (Xb', Yb') for which the error value of Equation (1) is zero. Typically, there are two unique solutions to Equation (1). Means 210 preferably selects the solution closest to the originally located corner.

Those skilled in the art will understand that means 210 may be used to correct the location of at least two corners. Where, as in the previous example, means 210 uses corners A and C to correct the location of corner B, means 210 may also use corners A and C to correct the location of corner D, if desired, using an equation analogous to Equation (1). In general, means 210 may correct any two diagonal corners using the remaining two corners.

Those skilled in the art will understand that alternative methods for correcting the locations of one or more corners are within the scope of the present invention. These alternative methods may rely on one or more of the following properties of rectangles (i.e., the ideal bar code symbol shape):

Opposite sides of a rectangle are parallel;
Opposite sides are of equal length;
Diagonals are of equal length;
Corner angles are 90 degrees; and
Diagonals and their corresponding sides satisfy the Pythagorean theorem.

In addition, means 210 preferably performs geometry tests to verify that the size and shape of the squared bar code symbol are within specified thresholds. These geometry tests are based on the relative locations of the four symbol corners.

After means 210 squares the symbol, means 212 transmits the (row, column) coordinates of the four corners of the "corrected" symbol to composite signal generator 106 and gradient-based signal generator 112 of FIG. 1. Processing of symbol locator 104 then continues to means 214 to determine whether the end of the current search line has been reached. If so, processing returns to means 202 to select a new search line. Otherwise, processing returns to means 204 to continue the search along the current search line. Symbol locator 104 continues to attempt to locate bar code symbols until the specified search line sequence has been exhausted or some other stop condition is satisfied.

Slow Method for Generating Composite Signals of Bar Code Symbols

Figure 6:
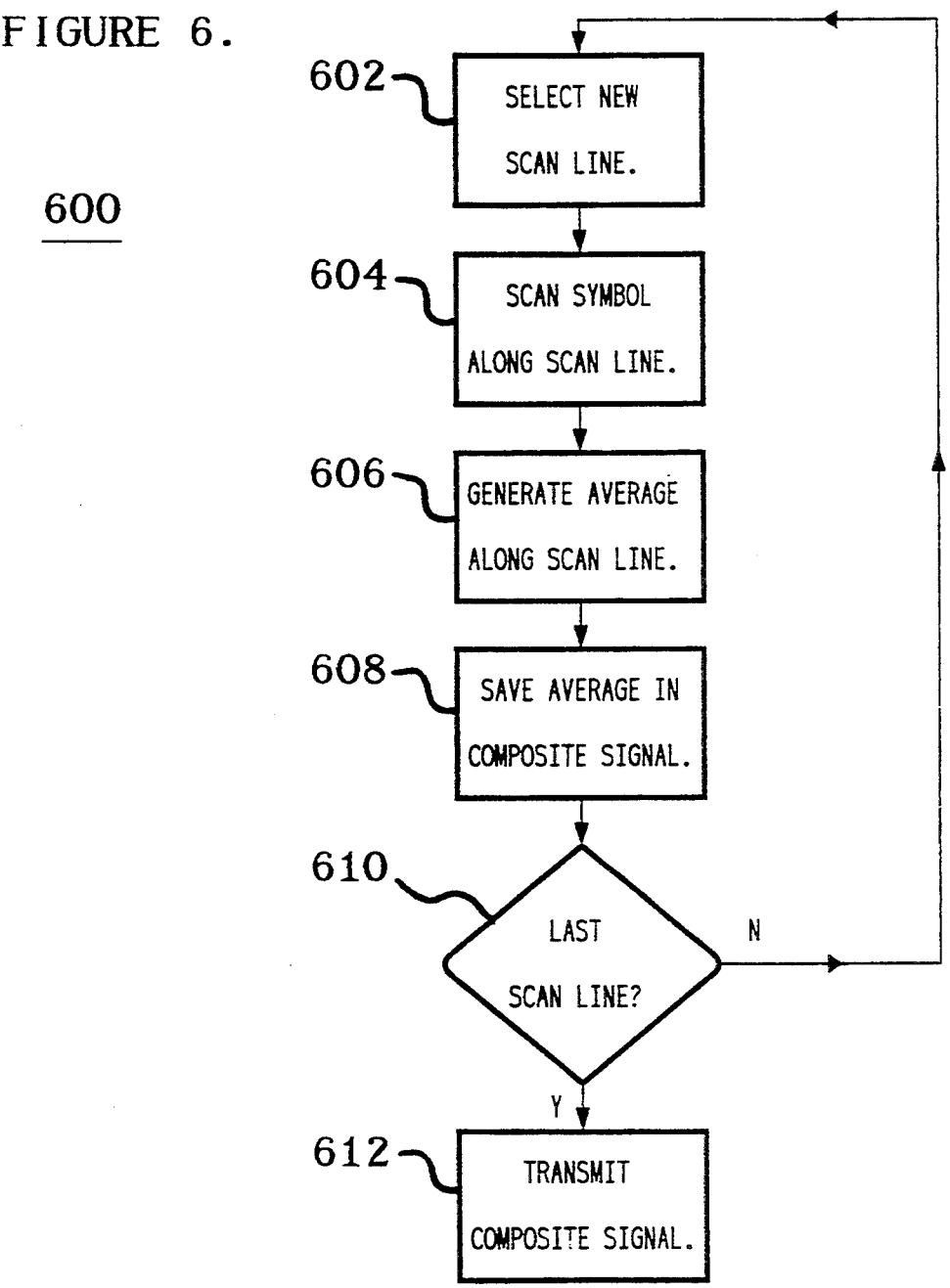
FIG. 6 is a block flow diagram of a slow method implemented by a preferred embodiment of the composite signal generator of the system of FIG. 1 for generating a composite signal of a bar code symbol.

Referring now to FIG. 6, there is shown a block flow diagram of a slow method implemented by composite signal generator 600. Composite signal generator 600 is a preferred embodiment of composite signal generator 106 of system 100 depicted in FIG. 1, where generator 600 is designed to implement the slow method for generating composite signals of bar code symbols. According to a preferred embodiment of the slow method, the bar code symbol is scanned along multiple scan lines.

The scan lines are determined from the symbol corners determined by symbol locator 104. For the slow method of generating composite signals, each scan line is parallel to the bars and spaces of the symbol. In addition, successive scan lines are separated from each other by a distance of less than one pixel width. When a bar code symbol is not aligned with the rows and columns of the pixel image, the scan lines will not correspond to image rows or columns. Thus, scan lines for the slow method of generating composite signals generally differ from the "search lines" used by symbol locator 104, which always correspond to either a row or column in the pixel image.

For each scan line, generator 600 averages the pixel intensities along the scan line to generate a pixel in a one-dimensional composite signal. By making the distance between successive scan lines less than one pixel, generator 600 oversamples the pixel image when generating the composite signal.

Figure 7:
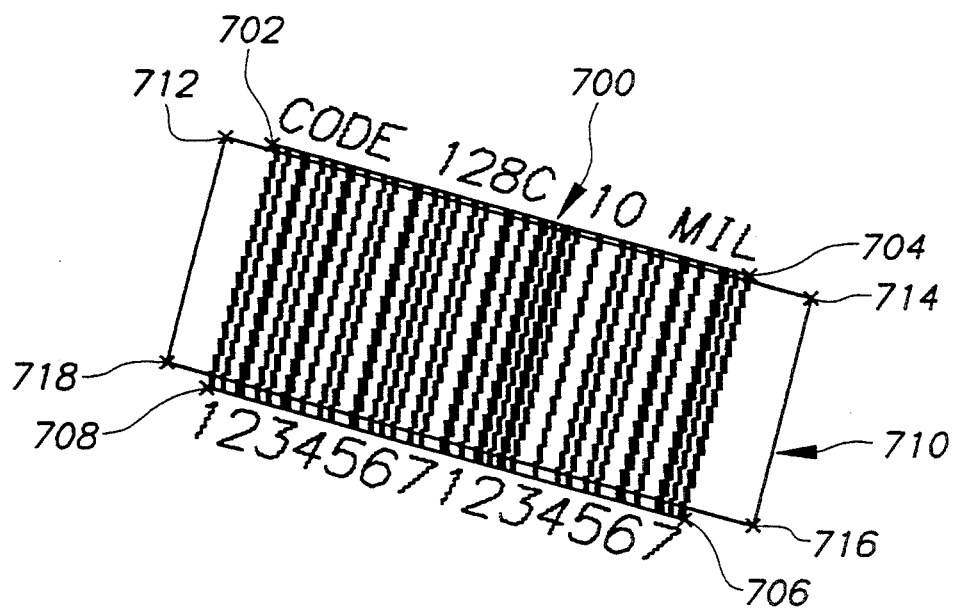
FIG. 7 is an image of a bar code symbol showing the sample rectangle over which the symbol is analyzed by the composite and gradient signal generators of the system of FIG. 1.

Referring now to FIG. 7, there is shown an image of bar code symbol 700 processed by composite signal generator 600. Generator 600 receives the coordinates of corners 702, 704, 706, and 708 from symbol locator 104. To avoid sampling errors common at the ends of symbol bars, generator 600 identifies a sample rectangle 710 defined by corners 712, 714, 716, and 718. Sample rectangle 710 is defined to be slightly (e.g., 3%) lower than the top of symbol 700, slightly (e.g., 3%) higher than the bottom of symbol 700, and slightly longer than symbol 700 (e.g., by a specified distance into each quiet zone). The lengths of each scan line are then defined by the boundaries of sample rectangle 710 and, as a result, each scan line (which, by definition, is parallel to the bars and spaces of symbol 700) starts above the bottom and below the top of symbol 700.

Referring again to FIG. 6, means 602 of composite signal generator 600 selects a sequence of parallel scan lines based on sample rectangle 710. Means 602 starts with the scan line defined by corners 712 and 718 at one end of sample rectangle 710 and selects each new scan line by shifting from the previous scan line toward the other end of sample rectangle 710 by a specified distance, where the specified distance is less than the width of a pixel.

Figure 8:
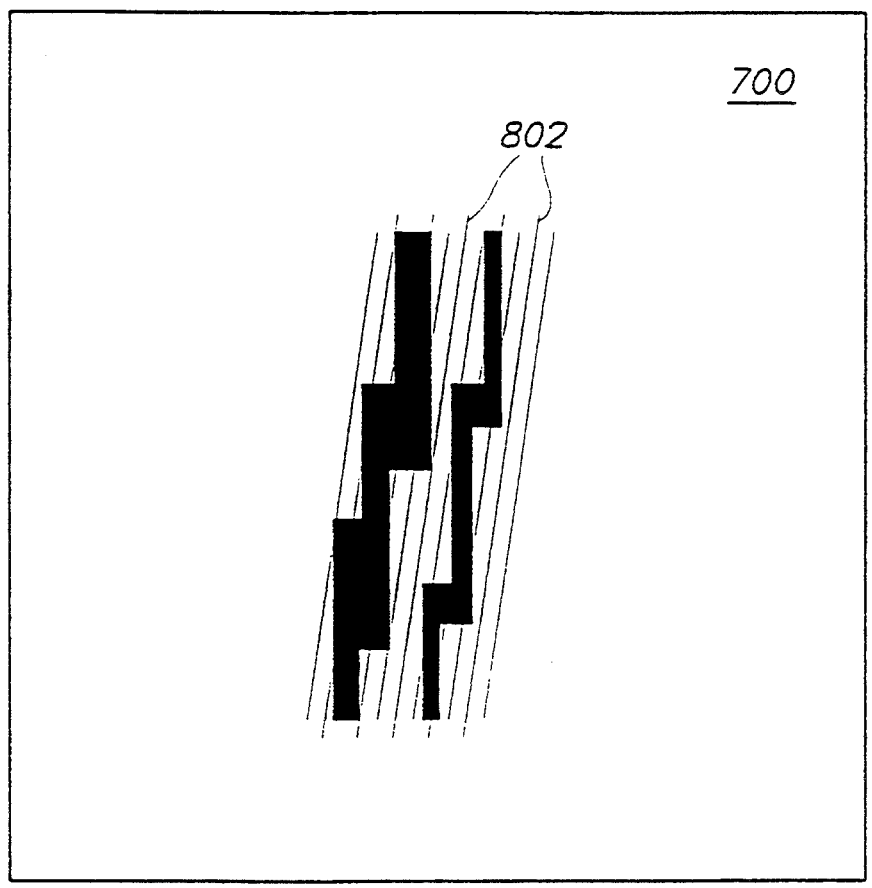
FIG. 8 is an image of a portion of the bar code symbol of FIG. 7 showing some of the scan lines used by the composite signal generator of the system of FIG. 1 in implementing the slow method of FIG. 6.

Referring now to FIG. 8, a portion of bar code symbol 700 is shown with several scan lines 802 superimposed thereon. For each scan line 802, means 604 scans the symbol image along the currently selected scan line and means 606 generates the average pixel intensity value of the pixels that lie along that scan line. Means 608 saves the average value as a pixel in a one-dimensional composite signal. Means 610 determines whether the current scan line is the last scan line, i.e., whether the opposite end of sample rectangle 710 defined by corners 714 and 716 has been reached. If not, then processing returns to means 602 to select the next scan line. Otherwise, means 612 transmits the complete composite signal to composite signal thresholder 108 of system 100 for further processing. The processing of thresholder 108 is described later in this specification in conjunction with FIG. 11.

Fast Method for Generating Composite Signals of Bar Code Symbols

Figure 9:
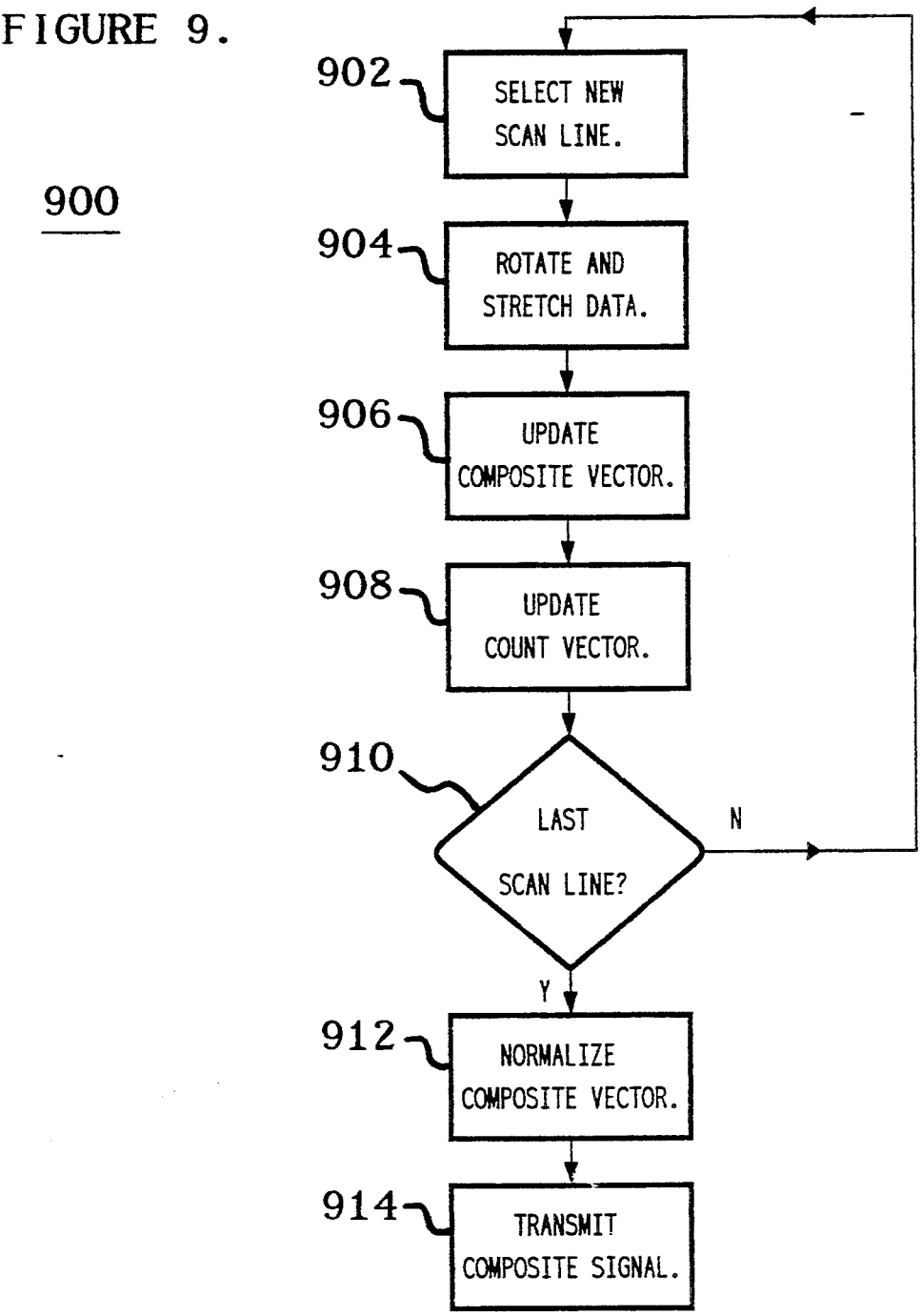
FIG. 9 is a block flow diagram of a slow method implemented by a preferred embodiment of the composite signal generator of the system of FIG. 1 for generating a composite signal of a bar code symbol.

Referring now to FIG. 9, there is shown a block flow diagram of a fast method implemented by composite signal generator 900. Composite signal generator 900 is a preferred embodiment of composite signal generator 106 of system depicted in FIG. 1, where generator 900 is designed to implement the fast method for generating composite signals of bar code symbols. The fast method is a preferred alternative to the slow method described earlier in this specification in conjunction with FIGS. 6, 7, and 8.

According to a preferred embodiment of the fast method, generator 900 selects a set of scan lines from the rows/columns in the pixel image that cross the bar code symbol. Note that, for the fast method, scan lines always correspond to either a row or column of the pixel image. As described earlier in this specification in conjunction with FIG. 6, for the slow methods, scan lines need not and generally will not coincide with a row or column of the pixel image.

For each scan line, generator 900 rotates and stretches the scan line data. Using the stretched, rotated data, generator 900 updates a one-dimensional composite vector and a one-dimensional count vector. After all the selected scan lines have been processed, generator 900 "normalizes" the one-dimensional vector to yield a one-dimensional composite signal for the bar code symbol.

Figure 10:
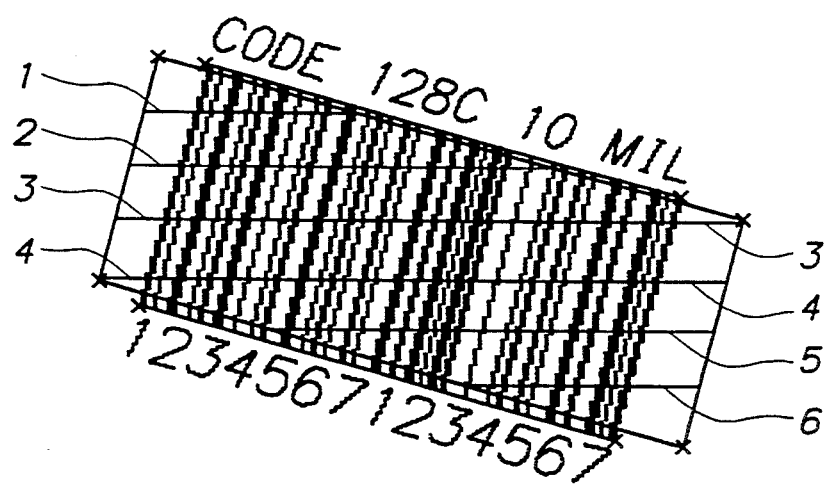
FIG. 10 is an image of the bar code symbol of FIG. 7 showing scan lines used by the composite signal generator of the system of FIG. 1 in implementing the fast method of FIG. 9.

Referring now to FIG. 10, there is shown an image of the bar code symbol of FIG. 7 with scan lines 1-6 used by composite signal generator 900 to implement the fast method of generating a composite signal superimposed thereon. Means 902 selects a sequence of scan lines. As shown in FIG. 10, each scan line crosses the bar code symbol and is part of a row (or column) of the pixel image. Means 902 need not select every row (or column) that crosses the bar code symbol. Thus, successive scan lines may be separated by more than one pixel. In addition, a scan line need not cross the entire bar code symbol. For example, in FIG. 10, only scan lines 3 and 4 cross the entire symbol.

Means 904 rotates and stretches the data from each current scan line. The angle through which means 904 rotates the scan line data is dictated by the orientation of the bar code symbol as indicated by the four symbol corners identified by symbol locator 104. Those skilled in the art will understand that such rotation effectively aligns the bars of the bar code symbol with the columns (or rows) of a rotated image.

The degree to which means 904 stretches the scan line data is determined by the oversampling rate, a specified parameter value, for example, three. Stretching the data in the fast method is similar to the selection of scan lines in the slow method that are separated by subpixel distances. Both the fast and slow methods are designed to oversample the original pixel image data.

Tables II through VI present an example of the processing performed by composite signal generator 900. The purpose of the discussion of these tables is to demonstrate the processing implemented by generator 900 and is not necessarily intended to represent a realistic situation. Note that lists (I), (J), (K), and (L) of Tables III, IV, and V will be discussed later in this specification in conjunction with the discussion of FIG. 15 and gradient signal generator 112.

Table II contains the original pixel intensity data for three scan lines of a gray-scale pixel image, where scan line #1 corresponds to row 0 of the image, scan line #2 corresponds to row 2, and scan line #3 corresponds to row 4. In this example, the higher the pixel intensity value, the brighter the pixel. Each scan line of Table II begins at column 0 and ends at column 9 of the pixel image. Thus, for example, the intensity of the pixel at (row=2) and (column=5) is 3. In this example, it has been determined, based upon the four corners located by symbol locator 104, that the bar code symbol is oriented at a counterclockwise 45-degree angle to the image rows.

TABLE II

Original Image Data.

| | Scan Line | | |
|---|---|---|---|
| Col | #1 Row 0 | #2 Row 2 | #3 Row 4 |
| 0 | 21 | 22 | 22 |
| 1 | 23 | 21 | 19 |
| 2 | 22 | 22 | 5 |
| 3 | 21 | 5 | 4 |
| 4 | 22 | 6 | 3 |
| 5 | 18 | 3 | 15 |
| 6 | 6 | 16 | 18 |
| 7 | 4 | 18 | 17 |
| 8 | 5 | 16 | 20 |
| 9 | 14 | 18 | 5 |

Table III presents the results from generator 900 processing scan line #1 (row 0). List (A) of Table III contains the original column number for each pixel in the pixel image along scan line #1. List (B) contains the intensity of each original pixel. List (C) contains the rotated column number (a real value) after means 904 rotates each original pixel by $\theta$ degrees, where, in this example, $\theta$ is 45 degrees. The rotated column number $C_r$ is determined by:

$$C_r = C_o \cos\theta + R_o \sin\theta, \qquad (2)$$

where $C_o$ is the original column number and $R_o$ is the original row number for the pixel in the pixel image.

TABLE III

Processing Scan Line #1 (Row 0).

| (A) Col | (B) Int | (C) Rot Col | (D) Str Col | (E) Rnd Col | (F) Int | (G) Cmp Vec | (H) Ct Vec | (I) Wht Grad | (J) Wht Vec | (K) Blk Grad | (L) Blk Vec |
|---|---|---|---|---|---|---|---|---|---|---|---|
| 0 | 21 | 0.00 | 0.00 | 0 | 21 | 21 | 1 | 0 | 0 | 0 | 0 |
| | | | | 1 | 21 | 21 | 1 | 0 | 0 | 0 | 0 |
| 1 | 23 | 0.71 | 2.12 | 2 | 23 | 23 | 1 | 2 | 2 | 0 | 0 |
| | | | | 3 | 23 | 23 | 1 | 2 | 2 | 0 | 0 |
| 2 | 22 | 1.41 | 4.24 | 4 | 22 | 22 | 1 | 0 | 0 | 1 | 1 |
| | | | | 5 | 22 | 22 | 1 | 0 | 0 | 1 | 1 |
| 3 | 21 | 2.12 | 6.36 | 6 | 21 | 21 | 1 | 0 | 0 | 1 | 1 |
| | | | | 7 | 21 | 21 | 1 | 0 | 0 | 1 | 1 |
| 4 | 22 | 2.83 | 8.49 | 8 | 22 | 22 | 1 | 1 | 1 | 0 | 0 |
| | | | | 9 | 22 | 22 | 1 | 1 | 1 | 0 | 0 |
| | | | | 10 | 22 | 22 | 1 | 1 | 1 | 0 | 0 |
| 5 | 18 | 3.54 | 10.61 | 11 | 18 | 18 | 1 | 0 | 0 | 4 | 4 |
| | | | | 12 | 18 | 18 | 1 | 0 | 0 | 4 | 4 |
| 6 | 6 | 4.24 | 12.73 | 13 | 6 | 6 | 1 | 0 | 0 | 12 | 12 |
| | | | | 14 | 6 | 6 | 1 | 0 | 0 | 12 | 12 |
| 7 | 4 | 4.95 | 14.85 | 15 | 4 | 4 | 1 | 0 | 0 | 2 | 2 |
| | | | | 16 | 4 | 4 | 1 | 0 | 0 | 2 | 2 |
| 8 | 5 | 5.66 | 16.97 | 17 | 5 | 5 | 1 | 1 | 1 | 0 | 0 |
| | | | | 18 | 5 | 5 | 1 | 1 | 1 | 0 | 0 |
| 9 | 14 | 6.36 | 19.09 | 19 | 14 | 14 | 1 | 9 | 9 | 0 | 0 |
| | | | | 20 | 14 | 14 | 1 | 9 | 9 | 0 | 0 |

KEY
(A): Column of pixel in original image
(B): Intensity of pixel in original image
(C): Column (real value) of pixel after rotation
(D): Column (real value) of pixel after rotation and stretching
(E): Column (rounded value) of rotated, stretched pixel
(F): Intensity of rotated, stretched pixel
(G): Corresponding value in composite vector
(H): Corresponding value in count vector
(I): Whitening gradient for current scan line
(J): Corresponding value in whitening gradient vector
(K): Blackening gradient for current scan line
(L): Corresponding value in blackening gradient vector List (D) of Table III contains the stretched column number (a real value) after means 904 stretches each rotated pixel by the oversampling rate. This example is based on an oversampling rate of three. List (D) is the product of list (C) and the oversampling rate (three, in this example). List (E) contains the rounded column numbers (integer values) for the stretched and rotated data, as generated by means 904. For example, stretched column 8.49 from list (D) is rounded to rounded column 8 in list (E). Similarly, stretched column 10.61 from list (D) is rounded to rounded column 11 in list (E). List (E) also contains the column numbers falling between the rounded columns. Thus, column 7 falls between rounded columns 6 and 8, while columns 9 and 10 fall between rounded columns 8 and 11. For purposes of the following discussion, all of the elements of list (E) are collectively referred to as rounded columns.

List (F) contains an intensity value for each rounded column in list (E). For each rounded column of list (E), means 904 repeats the intensity value from the original column of list (A) corresponding thereto. For example, rounded columns 6 and 7 of list (E) correspond to column 3 of list (A) and, therefore, the corresponding intensities of list (F) for those rounded columns are 21.

In an alternative preferred embodiment, means 904 interpolates between rounded columns to determine the intensity values in list (F). In that embodiment, the intensity in list (F) corresponding to rounded column 7 of list (E) would be 21.5, the midpoint of the intensities corresponding to rounded columns 6 and 8 of list (E).

Those skilled in the art will understand that the rotating and stretching implemented by means 904 may be performed in a single computation based on matrix multiplication where the rotation matrix is modified to include the oversampling rate.

As means 904 rotates and stretches the data for each scan line, means 906 updates a one-dimensional composite vector and means 908 updates a one-dimensional count vector based on the stretched, rotated data. The composite vector represents the "sum" of all the previously stretched, rotated scan lines. The count vector keeps track of how many times each element of the composite vector has been updated. Referring again to the example of Table III, list (G) represents the composite vector and list (H) represents the count vector after scan line #1 is processed.

After means 908 updates the count vector, means 910 determines whether the current scan line is the last scan line to be processed. If so, processing continues to means 912; otherwise, processing returns to means 902 to select the next scan line. Since, in the example of Table II, row 0 (i.e., scan line #1) is not the last scan line, means 910 directs processing to return to means 902 to select row 2 as the new scan line.

Table IV presents the results from generator 900 processing scan line #2 (row 2) of Table II. Lists (A) through (H) of Table IV are analogous to those of Table III. Means 906 forms an updated composite vector (list (G) of Table IV) by summing pixel values from the prior composite vector (list (G) of Table III) with corresponding intensity values from list (F) of Table IV.

Means 908 updates the count vector of list (H) by incrementing those elements that correspond to elements of the composite vector of list (G) that were updated.

TABLE IV

Processing Scan Line #2 (Row 2).

| (A) Col | (B) Int | (C) Rot Col | (D) Str Col | (E) Rnd Col | (F) Int | (G) Cmp Vec | (H) Ct Vec | (I) Wht Grad | (J) Wht Vec | (K) Blk Grad | (L) Blk Vec |
|---|---|---|---|---|---|---|---|---|---|---|---|
| | | | | 0 | | 21 | 1 | | 0 | | 0 |
| | | | | 1 | | 21 | 1 | | 0 | | 0 |
| | | | | 2 | | 23 | 1 | | 2 | | 0 |
| | | | | 3 | | 23 | 1 | | 2 | | 0 |
| 0 | 22 | 1.41 | 4.24 | 4 | 22 | 44 | 2 | 0 | 0 | 0 | 1 |
| | | | | 5 | 22 | 44 | 2 | 0 | 0 | 0 | 1 |
| 1 | 21 | 2.12 | 6.36 | 6 | 21 | 42 | 2 | 0 | 0 | 1 | 2 |
| | | | | 7 | 21 | 42 | 2 | 0 | 0 | 1 | 2 |
| 2 | 22 | 2.83 | 8.49 | 8 | 22 | 44 | 2 | 1 | 2 | 0 | 0 |
| | | | | 9 | 22 | 44 | 2 | 1 | 2 | 0 | 0 |
| | | | | 10 | 22 | 44 | 2 | 1 | 2 | 0 | 0 |
| 3 | 5 | 3.54 | 10.61 | 11 | 5 | 23 | 2 | 0 | 0 | 17 | 21 |
| | | | | 12 | 5 | 23 | 2 | 0 | 0 | 17 | 21 |
| 4 | 6 | 4.24 | 12.73 | 13 | 6 | 12 | 2 | 1 | 1 | 0 | 12 |
| | | | | 14 | 6 | 12 | 2 | 1 | 1 | 0 | 12 |
| 5 | 3 | 4.95 | 14.85 | 15 | 3 | 7 | 2 | 0 | 0 | 3 | 5 |
| | | | | 16 | 3 | 7 | 2 | 0 | 0 | 3 | 5 |
| 6 | 16 | 5.66 | 16.97 | 17 | 16 | 21 | 2 | 13 | 14 | 0 | 0 |
| | | | | 18 | 16 | 21 | 2 | 13 | 14 | 0 | 0 |
| 7 | 18 | 6.36 | 19.09 | 19 | 18 | 32 | 2 | 2 | 11 | 0 | 0 |
| | | | | 20 | 18 | 32 | 2 | 2 | 11 | 0 | 0 |
| 8 | 16 | 7.07 | 21.21 | 21 | 16 | 16 | 1 | 0 | 0 | 2 | 2 |
| | | | | 22 | 16 | 16 | 1 | 0 | 0 | 2 | 2 |
| 9 | 18 | 7.78 | 23.33 | 23 | 18 | 18 | 1 | 2 | 2 | 0 | 0 |
| | | | | 24 | 18 | 18 | 1 | 2 | 2 | 0 | 0 |

Note that none of the stretched, rotated data from scan line #2 coincides with rounded columns 0-3, but that some of the data do coincide with new rounded columns 21-24. As a result, some elements of the composite vector are not updated. The count vector is used to keep track of how many times each element of the composite vector is updated. Those skilled in the art will understand that this non-uniform updating of composite and count vectors will also occur when processing scan lines that do not cross the entire bar code symbol, for example, scan line 1 of FIG. 10.

After processing scan line #2, means 910 directs processing to return to means 902 to select scan line #3 (row 4), the last scan line of Table II. Table V presents the results from generator 900 processing scan line #3 (row 4) of Table II. Once again, lists (A) through (H) of Table V are analogous to those of Tables III and IV.

TABLE V

Processing Scan Line #3 (Row 4).

| (A) Col | (B) Int | (C) Rot Col | (D) Str Col | (E) Rnd Col | (F) Int | (G) Cmp Vec | (H) Ct Vec | (I) Wht Grad | (J) Wht Vec | (K) Blk Grad | (L) Blk Vec |
|---|---|---|---|---|---|---|---|---|---|---|---|
| | | | | 0 | | 21 | 1 | | 0 | | 0 |
| | | | | 1 | | 21 | 1 | | 0 | | 0 |
| | | | | 2 | | 23 | 1 | | 2 | | 0 |
| | | | | 3 | | 23 | 1 | | 2 | | 0 |
| | | | | 4 | | 44 | 2 | | 0 | | 1 |
| | | | | 5 | | 44 | 2 | | 0 | | 1 |
| | | | | 6 | | 42 | 2 | | 0 | | 2 |
| | | | | 7 | | 42 | 2 | | 0 | | 2 |
| 0 | 22 | 2.83 | 8.49 | 8 | 22 | 66 | 3 | 0 | 2 | 0 | 0 |
| | | | | 9 | 22 | 66 | 3 | 0 | 2 | 0 | 0 |
| | | | | 10 | 22 | 66 | 3 | 0 | 2 | 0 | 0 |
| 1 | 19 | 3.54 | 10.61 | 11 | 19 | 42 | 3 | 0 | 0 | 3 | 24 |
| | | | | 12 | 19 | 42 | 3 | 0 | 0 | 3 | 24 |
| 2 | 5 | 4.24 | 12.73 | 13 | 5 | 17 | 3 | 0 | 1 | 14 | 36 |
| | | | | 14 | 5 | 17 | 3 | 0 | 1 | 14 | 36 |
| 3 | 4 | 4.95 | 14.85 | 15 | 4 | 11 | 3 | 0 | 0 | 1 | 6 |
| | | | | 16 | 4 | 11 | 3 | 0 | 0 | 1 | 6 |
| 4 | 3 | 5.66 | 16.97 | 17 | 3 | 24 | 3 | 0 | 14 | 1 | 1 |

TABLE V-continued

| | | | | | | | | | | | |
|---|---|---|---|---|---|---|---|---|---|---|---|
| (A) Col | (B) Int | (C) Rot Col | (D) Str Col | (E) Rnd Col | (F) Int | (G) Cmp Vec | (H) Ct Vec | (I) Wht Grad | (J) Wht Vec | (K) Blk Grad | (L) Blk Vec |

Processing Scan Line #3 (Row 4).

| (A) Col | (B) Int | (C) Rot Col | (D) Str Col | (E) Rnd Col | (F) Int | (G) Cmp Vec | (H) Ct Vec | (I) Wht Grad | (J) Wht Vec | (K) Blk Grad | (L) Blk Vec |
|---|---|---|---|---|---|---|---|---|---|---|---|
| | | | | 18 | 3 | 24 | 3 | 0 | 14 | 1 | 1 |
| 5 | 15 | 6.36 | 19.09 | 19 | 15 | 47 | 3 | 12 | 23 | 0 | 0 |
| | | | | 20 | 15 | 47 | 3 | 12 | 23 | 0 | 0 |
| 6 | 18 | 7.07 | 21.21 | 21 | 18 | 34 | 2 | 3 | 3 | 0 | 2 |
| | | | | 22 | 18 | 34 | 2 | 3 | 3 | 0 | 2 |
| 7 | 17 | 7.78 | 23.33 | 23 | 17 | 35 | 2 | 0 | 2 | 1 | 1 |
| | | | | 24 | 17 | 35 | 2 | 0 | 2 | 1 | 1 |
| 8 | 20 | 8.49 | 25.46 | 25 | 20 | 20 | 1 | 3 | 3 | 0 | 0 |
| | | | | 26 | 20 | 20 | 1 | 3 | 3 | 0 | 0 |
| | | | | 27 | 20 | 20 | 1 | 3 | 3 | 0 | 0 |
| 9 | 5 | 9.19 | 27.58 | 28 | 5 | 5 | 1 | 0 | 0 | 15 | 15 |
| | | | | 29 | 5 | 5 | 1 | 0 | 0 | 15 | 15 |

After processing scan line #3, means 910 directs processing to continue to means 912. Means 912 "normalizes" the composite vector to generate a one-dimensional composite signal by dividing each element in the composite vector by the corresponding element in the count vector. Means 914 then transmits this composite signal to composite signal thresholder 108 of system 100.

Table VI presents the one-dimensional composite signal generated by means 912. Lists (E), (G), and (H) are identical to those lists of Table V. List (M) represents the composite signal generated by means 909 by dividing the elements of the composite vector of list (G) by the corresponding elements of the count vector of list (H). Means 914 transmits the composite signal of list (M) to thresholder 108.

TABLE VI

Processing Composite Signal.

| (E) Rnd Col | (G) Cmp Vec | (H) Ct Vec | (M) Cmp Sig | (N) Thr Sig |
|---|---|---|---|---|
| 0 | 21 | 1 | 21.0 | 1 |
| 1 | 21 | 1 | 21.0 | 1 |
| 2 | 23 | 1 | 23.0 | 1 |
| 3 | 23 | 1 | 23.0 | 1 |
| 4 | 44 | 2 | 22.0 | 1 |
| 5 | 44 | 2 | 22.0 | 1 |
| 6 | 42 | 2 | 21.0 | 1 |
| 7 | 42 | 2 | 21.0 | 1 |
| 8 | 66 | 3 | 22.0 | 1 |
| 9 | 66 | 3 | 22.0 | 1 |
| 10 | 66 | 3 | 22.0 | 1 |
| 11 | 42 | 3 | 14.0 | 1 |
| 12 | 42 | 3 | 14.0 | 1 |
| 13 | 17 | 3 | 5.7 | 0 |
| 14 | 17 | 3 | 5.7 | 0 |
| 15 | 11 | 3 | 3.7 | 0 |
| 16 | 11 | 3 | 3.7 | 0 |
| 17 | 24 | 3 | 8.0 | 0 |
| 18 | 24 | 3 | 8.0 | 0 |
| 19 | 47 | 3 | 15.7 | 1 |
| 20 | 47 | 3 | 15.7 | 1 |
| 21 | 34 | 2 | 17.0 | 1 |
| 22 | 34 | 2 | 17.0 | 1 |
| 23 | 35 | 2 | 17.5 | 1 |
| 24 | 35 | 2 | 17.5 | 1 |
| 25 | 20 | 1 | 20.0 | 1 |
| 26 | 20 | 1 | 20.0 | 1 |
| 27 | 20 | 1 | 20.0 | 1 |
| 28 | 5 | 1 | 5.0 | 0 |
| 29 | 5 | 1 | 5.0 | 0 |

KEY
(M): Normalized composite signal = composite vector/count vector
(N): Thresholded composite signal (threshold value = 12.0)

Thresholding and Filtering the One-Dimensional Composite Signal

Figure 11:
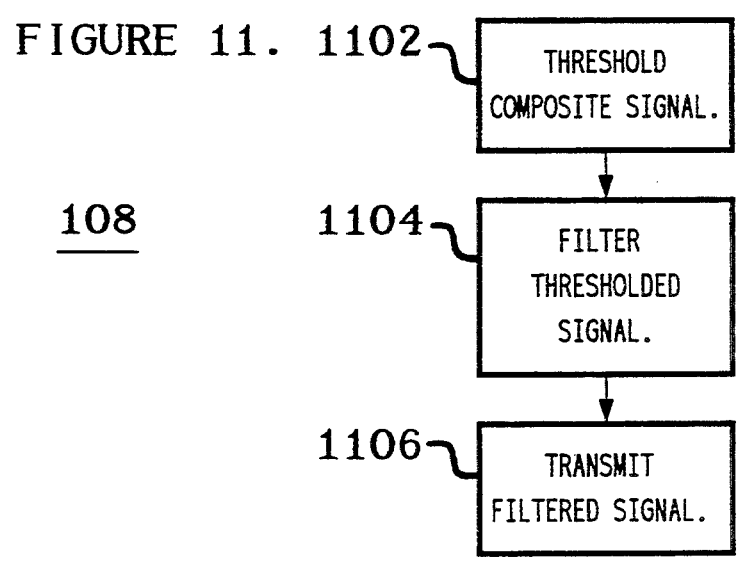
FIG. 11 is a block flow diagram of the processing implemented by the composite signal thresholder of the system of FIG. 1 to threshold the composite signal of a bar code symbol.

Referring now to FIG. 11, there is shown a block flow diagram of the processing implemented by composite signal thresholder 108 of system 100 to threshold a one-dimensional composite signal of a bar code symbol. Thresholder 108 processes a composite signal, whether the composite signal was generated by generator 600 using the slow method described earlier in this specification in conjunction with FIG. 6 or by generator 900 using the fast method described earlier in this specification in conjunction with FIG. 9. Thresholder 108 thresholds the composite signal into binary black ("0") and white ("1") segments that correspond to the bars and spaces of the bar code symbol. Thresholder 108 then filters the thresholded signal to eliminate spurious bars and spaces. Thresholder 108 then transmits the filtered signal to composite signal decoder 110, which uses conventional bar code symbol decoding methods to decode the filtered signal.

Means 1102 of thresholder 108 thresholds the composite signal received from generator 106. Means 1102 preferably employs adaptive thresholding to threshold the composite signal, although means 1102 may use any conventional thresholding algorithm including thresholding with a fixed threshold value.

Referring again to Table VI, list (N) represents the binary signal generated by means 1102 by thresholding the composite signal of list (M) using a fixed threshold value of 12. If an element of the composite signal is greater than 12, then the corresponding binary element is 1 (white); otherwise the corresponding binary element is 0 (black). In the example of Tables II through VI, the fast method of generating a composite signal indicates a bright-to-dark transition between rounded columns 12 and 13, a dark-to-bright transition between rounded columns 18 and 19, and another bright-to-dark transition between rounded columns 27 and 28. These transitions correspond to the edges of bars in the bar code symbol.

Means 1102 preferably employs an adaptive thresholding algorithm to locate transitions in the composite signal. Under a preferred adaptive thresholding algorithm, means 1102 uses the local minimum and maximum intensity values in the composite signal to determine the threshold value used to locate the transition between those local minima and maxima.

Referring again to Table VI, the first local maximum intensity value is 23.0 corresponding to rounded columns 2 and 3 and the first local minimum intensity value is 3.7 corresponding to rounded columns 15 and 16. In this example, means 1102 selects one-half the sum of the local maximum and minimum (0.5×(23.0+3.7)) or 13.4 as the threshold value to be applied between rounded column 2 and rounded column 16. Using that threshold value, means 1102 locates the bright-to-dark transition between rounded columns 12 and 13. If, in a particular situation, two or more consecutive elements in the composite signal are equal to the threshold value, the middle element of that series of consecutive elements is selected as the bright/dark transition.

To minimize the effect of noise, local maxima and minima are defined in terms of a specified significance value. If the difference between a local maximum and the next local minimum is not greater than the specified significance value, then means 1102 rejects them and continues to search for proper local minimum and maximum pixels in the composite signal.

For example, consider the composite signal having intensity values (5, 3, 6, 25, 22, 26, 10, 4, 7). Assume that the significance value is determined to be 5. Means 1102 scans from left to right to find a local minimum at 3. Means 1102 continues to scan to find a local maximum at 25. Since the difference between the local maximum (25) and the local minimum (3) is greater than the significance value (5), means 1102 retains these values.

Means 1102 then scans for the next local minimum at 22. Since the difference between the local maximum (25) and the local minimum (22) is not greater than the significance value (5), means 1102 continues to look for a proper local minimum. While looking for a proper local minimum, means 1102 updates the local maximum, if necessary. Thus, as means 1102 scans to find the next local minimum at 4, means 1102 updates the local maximum to be 26. Since the difference between the updated local maximum (26) and the new local minimum (4) is greater than the significance value (5), means 1102 selects these pixels as the proper local maximum and minimum. These local minimum and maximum values are then averaged to calculate the threshold value used to find the pixel corresponding to the transition between the local maximum and minimum. Note that if the significance value had been 2 instead of 5, then 25 and 26 would both be considered to be local maxima.

The selected significance value determines the immunity of means 1102 to noise. High significance values provide substantial noise immunity, but may also result in the loss of true bright/dark transitions in the composite signal. Low significance values, on the other hand, may lead to the spurious recognition of transitions in noisy regions. It is preferable to use significance values that are too low rather than too high. This is true because subsequent filtering may be able to eliminate spurious transitions, but nothing can be done to recover from the loss of true transitions. In a preferred embodiment, the significance value is based on a fraction (e.g., one-eighth) of the dynamic range of the composite signal as defined by the overall minimum and maximum values within the composite signal.

Figures 12, 13:
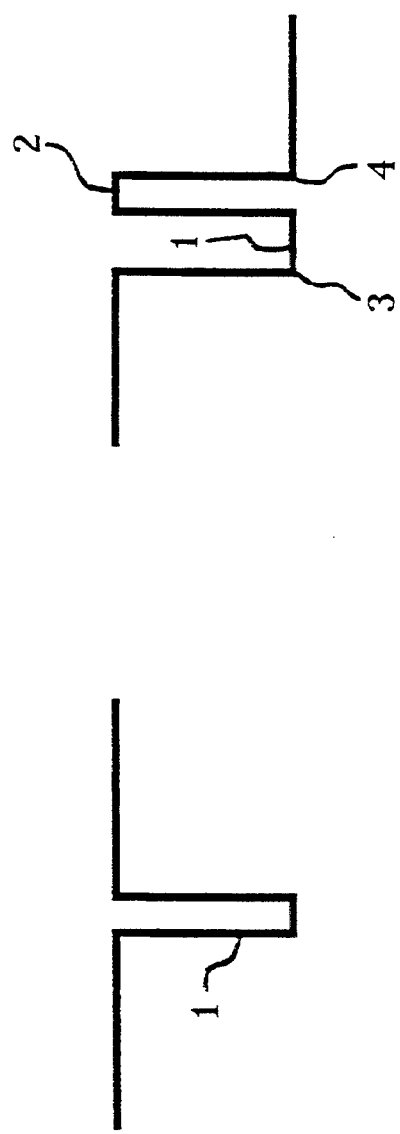
FIG. 12 depicts the binary representation of part of a bar code symbol signal with a spurious bar.
FIG. 13 depicts the binary representation of part of a bar code symbol signal with either a spurious bar or a spurious space.

Referring now to FIGS. 12 and 13, there are shown two common examples of spurious bright/dark transitions that may result from using relatively low significance values to threshold a noisy composite signal. FIG. 12 depicts the binary representation of a spurious bar 1 in what should be a single space. FIG. 13 depicts the binary representation of either a spurious bar 1 or a spurious space 2, where only one space and one bar should exist.

Means 1104 filters the thresholded composite signal to remove spurious bars and spaces. A spurious bar/space is one that is too narrow to be valid as determined by the known characteristics of the bar code symbology being decoded. Threshold values may be set based on certain fractions (e.g., one-half) of the minimum bar and space widths in the particular symbology to be decoded. If a bar or space is narrower than the specified threshold, then the bar/space is removed. In FIG. 12, means 1104 removes the spurious bar 1 to create a single space, because bar 1 is too narrow to be valid.

In FIG. 13, bar 1 and space 2 may both be narrower than the applicable thresholds. In such case, means 1104 eliminates the smaller of the two by merging the neighboring bars/spaces together. Thus, if bar 1 is narrower than space 2, then means 1104 removes bar 1 to yield a single space that ends at point 4. If, however, bar 1 is not narrower than space 2, then means 1104 removes space 2 to yield a single space that ends at point 3.

Referring again to FIG. 11, after means 1104 filters the thresholded signal, means 1106 transmits the filtered signal to composite signal decoder 110, which decodes the filtered signal using conventional bar code symbol decoding methods.

Decoding Composite Signals

Composite signal decoder 110 decodes the filtered composite signals generated by thresholder 108 using conventional bar code symbol decoding methods. Decoder 110 may be designed to decode any desired symbology, such as Code 128, Code 39, and Interleaved Code 2 of 5.

When decoding Code 128 bar code symbols, decoder 110 makes standard like-edge to like-edge measurements as described in the section entitled "Determining Character Choices from Subpixel Interpolation Results" of U.S. patent application Ser. No. 07/927,910, the disclosure of which is incorporated herein by reference. Decoder 110 calculates the standard t1, t2, t3, and t4 values, scans a mapping table, and performs Code 128 checksum computations to support decoding of all three character sets of Code 128.

Figure 14:
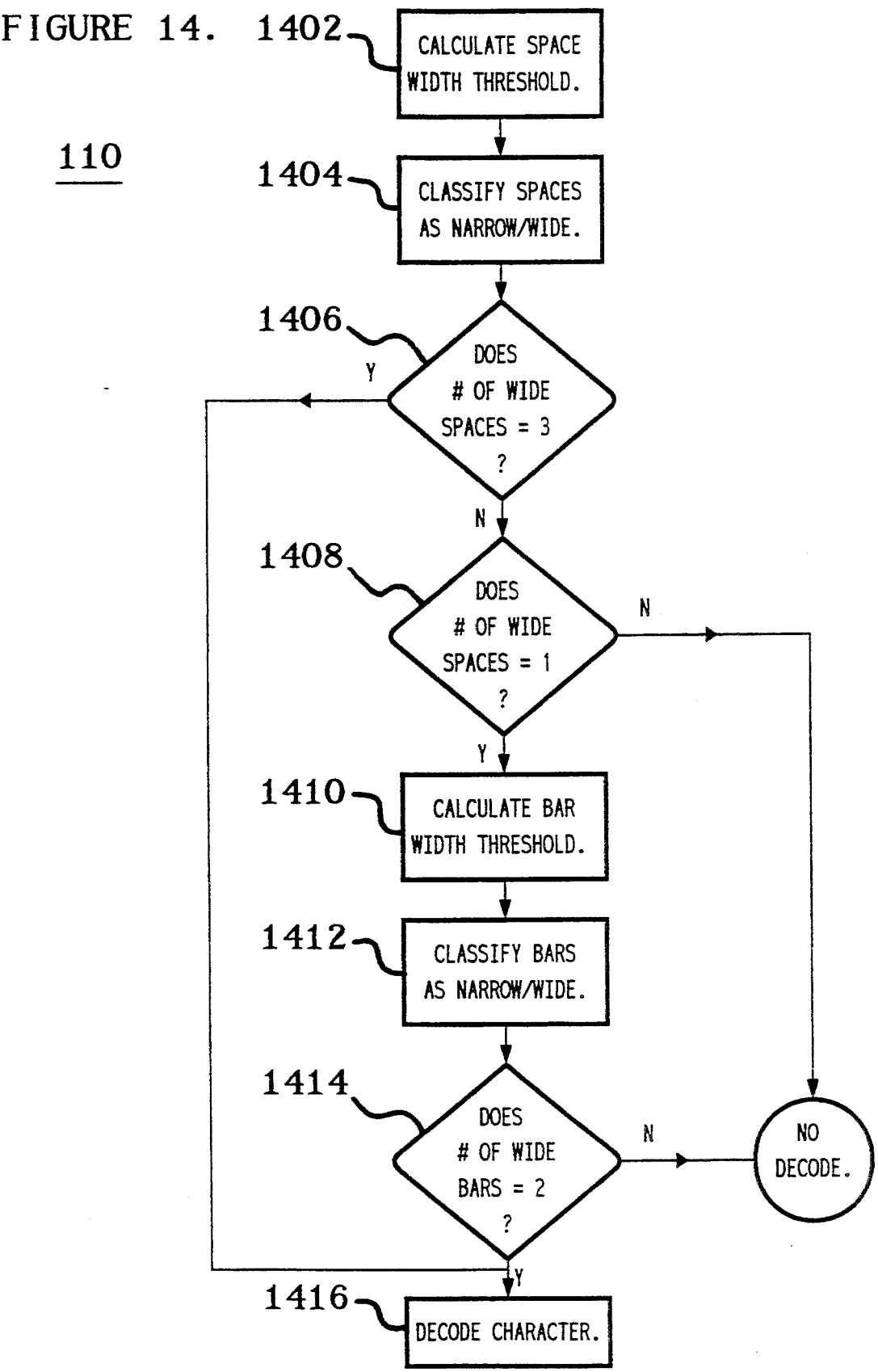
FIG. 14 is a block flow diagram of the processing implemented by the composite signal decoder of the system of FIG. 1 to decode the characters of a Code 39 bar code symbol.

Referring now to FIG. 14, there is shown a block flow diagram of the processing implemented by composite signal decoder 110 of system 100 to decode the characters of a Code 39 bar code symbol. Code 39 symbology is based on characters having five bars and four spaces. In Code 39, three of the bars/spaces must be wide and the other six bars/spaces must be narrow. In addition, a Code 39 character must have either two wide bars and one wide space, or three wide spaces. A character with exactly zero, two, or four wide spaces is not a valid Code 39 character. Similarly, if a character has exactly one wide space, but does not have exactly two wide bars, then it is not a valid Code 39 character. When decoding Code 39 bar code symbols, decoder 110 examines five bars and four spaces of the bar code symbol at a time, classifies them as wide or narrow, and decodes the character by referring to a look-up table.

To decode a Code 39 character, decoder 110 first analyzes the four spaces of the character. Means 1402 in FIG. 14 calculates a space-width threshold for the character, where the space-width threshold is the average of the width of the widest space and the width of the narrowest space in the character.

Means 1404 then classifies each of the four spaces as either wide or narrow by comparing the width of each space to the space-width threshold. Means 1404 classifies a space as wide if its width is greater than the space-width threshold; otherwise, the space is narrow.

If means 1404 classifies three of the spaces as wide and one as narrow, then means 1406 directs processing to means 1416 to decode the character; otherwise, processing continues to means 1408. If decoder 110 determines that there are three wide spaces and one narrow space, then decoder 110 assumes that all five bars are narrow and that the character is a valid Code 39 character.

If means 1404 classifies one of the spaces as wide and three as narrow, then means 1408 directs processing to means 1410; otherwise, the character cannot be decoded. If decoder 110 determines that there are not exactly one or three wide spaces, then the character is not a valid Code 39 character and cannot be decoded as such.

If decoder 110 determines that there are three narrow spaces and one wide space, then decoder 110 analyzes the five bars of the character. Means 1410 calculates a bar-width threshold for the character, where the bar-width threshold is the average of the width of the widest bar and the width of the narrowest bar in the character.

Means 1412 then classifies each of the five bars as either wide or narrow by comparing the width of each bar to the bar-width threshold. Means 1412 classifies a bar as wide if its width is greater than the bar-width threshold; otherwise, the bar is narrow.

If means 1412 classifies two of the bars as wide and three as narrow, then means 1414 directs processing to means 1416 to decode the character; otherwise, the character is not a valid Code 39 character and cannot be decoded as such. If, after determining that there is exactly one wide space, decoder 110 determines that there are two wide bars and three narrow bars, then decoder 110 assumes that the character is a valid Code 39 character.

After successfully locating the three wide bars/spaces and six narrow bars/spaces of the Code 39 character, means 1416 decodes the character by searching through a Code 39 look-up table for the appropriate alphanumeric character using the sequence of wide and narrow bars and spaces identified by means 1404 and 1412. In a preferred embodiment, decoder 110 also performs Code 39 checksum analysis.

In the preferred embodiment of FIG. 14, decoder 110 analyzes the widths of bars and spaces independently by calculating two different width thresholds—one for classifying spaces and one for classifying bars. Decoder 110 uses these different width thresholds for spaces and bars to reduce decoding errors that may result from pixel image bleeding.

When pixel images are generated using conventional imaging systems, dark regions in the images often tend to bleed into bright regions. As a result of this bleeding, the bars in imaged bar code symbols may appear wider and spaces may appear narrower than those in the true bar code symbol. At times, true narrow bars (that is, a bar that is narrow in the true bar code symbol) may even appear in the pixel image to be wider than true wide spaces. These apparent changes in the widths of bars and spaces may lead to errors in the decoding of the bar code symbols. When decoding Code 39 symbols, for example, decoder 110 preferably classifies bars and spaces independently using different width thresholds to reduce the decoding errors that result from pixel image bleeding.

Those skilled in the art will understand that this independent classification of bars and spaces in bar code symbols to correct for the effects of bleeding may be employed to decode symbols other than those of the Code 39 symbology.

For example, decoder 110 preferably uses independent classification of bars and spaces to decode Interleaved Code 2 of 5 (I2of5) bar code symbols. In I2of5 characters, five bars and five spaces encode two decimal digits. The bars encode the first digit while the spaces encode the second digit. Each digit is represented by two wide bars (or spaces) and three narrow bars (or spaces). Decoder 110 takes thirteen bars and spaces of an I2of5 symbol at a time and classifies them as wide or narrow by independently classifying the bars and spaces, similar to the independent classification scheme implemented by decoder 110 for Code 39 symbols. The result is a 13-bit value where each bit represents the width of a corresponding bar/space.

Decoder 110 then searches an I2of5 look-up table twice, once for the bars and once for the spaces. Decoder 110 uses only the first ten bars/spaces (top 10 bits) during the table look-up. The other three bits may correspond to the I2of5 stop pattern. If the last three bits are a valid stop pattern (wide bar, narrow space, wide bar), then decoding stops. Otherwise, another thirteen bars and spaces are analyzed, where the first three bars and spaces are the last three bars and spaces from the previous list. Decoder 110 also preferably performs I2of5 checksum analysis.

After decoding the thresholded composite signal, decoder 110 transmits the decoded signal to output selector of system 100.

Generating Gradient Signals for a Bar Code Symbol

Figure 15:
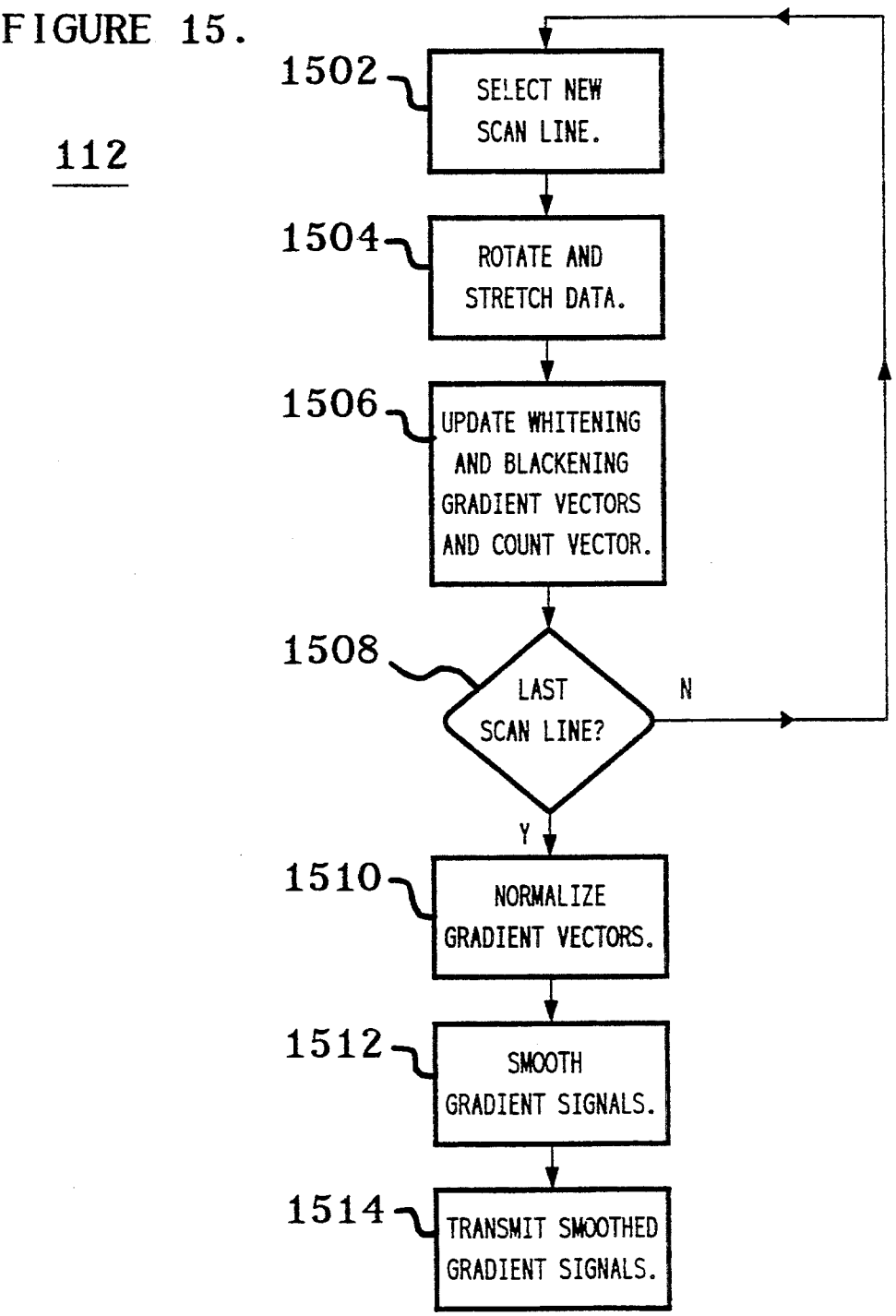
FIG. 15 is a block flow diagram of the processing implemented by the gradient signal generator of the system of FIG. 1 to generate whitening and blackening gradient signals for a bar code symbol.

Referring now to FIG. 15, there is shown a block flow diagram of the processing implemented by gradient signal generator 112 of system 100 to generate whitening and blackening gradient signals for a bar code symbol located by symbol locator 104. The gradient signals are used to find the transitions between bars and spaces (i.e., leading and trailing edges of bars) in the bar code symbol.

In a preferred embodiment, generator 112 selects scan lines from the set of rows or columns in the pixel image that cross the bar code symbol. These scan lines are preferably the same scan lines as those selected for the fast method for generating composite signals, described earlier in this specification in conjunction with FIG. 9.

For each scan line, generator 112 rotates and stretches the scan line data and updates two one-dimensional gradient vectors—a whitening gradient vector and a blackening gradient vector—and a one-dimensional count vector based on the stretched, rotated data. After all the selected scan lines have been processed, generator 112 normalizes the two gradient vectors to generate whitening and blackening gradient signals, smoothes the gradient signals, and transmits the smoothed gradient signals to gradient signal processor 114 for further processing.

Means 1502 selects a sequence of scan lines. Means 1502 preferably selects the same sequence of scan lines as that selected by means 902 of composite signal generator 900 in FIG. 9. Means 1504 rotates and stretches the data from the currently selected scan line. Means 1504 preferably performs the same rotation and stretching function as that performed by means 904 of generator 900. In a preferred embodiment, operations common to composite signal generator 900 and gradient signal generator 112 (e.g., the selection, rotation, and stretching of scan lines) are combined to avoid duplication.

Referring again to the example of Table II, the processing of means 1504 for each of the scan lines is identical to the processing performed by means 1504, as described earlier in this specification in conjunction with FIG. 9. Thus, lists (A) through (F) of Tables III, IV, and V may also be used describe the operation of gradient signal generator 112.

After means 1504 rotates and stretches the first scan line, means 1506 updates a whitening and a blackening gradient vector using the rotated, stretched data. In a preferred embodiment, the whitening gradient vector is a one-dimensional vector that accumulates the magnitudes of all the pixel-to-pixel changes in which the pixel intensity values increase. Analogously, the blackening gradient vector is a one-dimensional vector that accumulates the magnitudes of all the pixel-to-pixel changes in which the pixel intensity values decrease. For each gradient vector, the magnitude of the difference between adjacent image pixels is accumulated, not the absolute pixel values themselves. In an alternative preferred embodiment, the whitening and blackening gradient vectors accumulate the number of pixel-to-pixel changes that increase and decrease, respectively, as opposed to accumulating the magnitudes of those changes.

The whitening and blackening gradients may be defined in terms of the first derivative of the scan line data. The whitening gradients correspond to those first derivatives that are greater than zero, while the blackening gradients correspond to the magnitudes of the first derivatives that are less than zero.

Referring again to Table III, list (I) represents the whitening gradients for scan line #1 and list (J) represents the whitening gradient vector after means 1506 processes scan line #1. In general, the whitening gradient vector represents the sum of corresponding whitening gradients for all the scan lines that have been processed. Since scan line #1 is the first scan line to be processed in the example, the whitening gradients of list (I) are identical to the whitening gradient vector of list (J).

Since the intensity increases from 21 to 23 from pixel (0,0) to pixel (0,1) in the original data, the corresponding whitening gradients in list (I) for rounded columns 2 and 3 are 2. If the change from the previous pixel to the current pixel in the original image is not positive, then there is no whitening gradient for that current pixel. For example, since the intensity decreases from 23 to 22 from pixel (0,1) to pixel (0,2) in the original data, the corresponding whitening gradients in list (I) for rounded columns 4 and 5 are 0.

Similarly, list (K) of Table III represents the blackening gradients for scan line #1. For example, since the intensity decreases from 22 to 18 from pixel (0,4) to pixel (0,5) in the original data, the corresponding blackening gradients for rounded columns 11 and 12 are 4. If the change from the previous pixel to the current pixel in the original image is not negative, then there is no blackening gradient for that current pixel. For example, since the intensity increases from 4 to 5 from pixel (0,7) to pixel (0,8) in the original data, the corresponding blackening gradients for rounded columns 17 and 18 are 0. List (L) of Table III represents the blackening gradient vector (i.e., the accumulated blackening gradients) after means 1506 processes scan line #1.

Means 1506 also updates a one-dimensional count vector that is identical to the count vector generated by means 908 of composite signal generator 900, as described earlier in this specification in conjunction with FIG. 9. Thus, list (H) of Tables III, IV, and V also applies to the description of gradient signal generator 112.

After means 1506 updates both gradient vectors and the count vector for the current scan line, means 1508 determines whether the current scan line is the last scan line for the bar code symbol. If not, then processing returns to means 1502 to select the next scan line. Otherwise, processing proceeds to means 1510.

In the example of Table II, after scan line #1 is processed, processing returns to means 1502 to select scan line #2 as the new scan line. Table IV presents the results of processing scan line #2. Lists (I) and (K) of Table IV represent the whitening and blackening gradients, respectively, for scan line #2. Lists (J) and (L) represent the updated gradient vectors. Means 1506 updates the gradient vectors by "adding" the gradients for scan line #2 to the gradient vectors of Table III. Similarly, Table V presents the results of processing scan line #3.

After the last scan line is processed, means 1508 directs processing to means 1510. Means 1510 normalizes the whitening and blackening gradient vectors by dividing the elements of each gradient vector by the corresponding elements of the count vector.

Tables VII and VIII present the results of processing the whitening and blackening gradient vectors, respectively. Lists (E), (H), and (J) of Table VII and lists (E), (H), and (L) of Table VIII are identical to the corresponding lists of Table V. List (O) of Table VII represents the whitening gradient signal that results from means 1510 normalizing the whitening gradient vector of list (J). Means 1510 determines each element in list (O) by dividing the corresponding element of list (J) by the corresponding element of list (H). Similarly, list (T) of Table VIII represents the blackening gradient signal that results from means 1510 normalizing the blackening gradient vector of list (L).

TABLE VII

| | | | Processing Whitening Gradient. | | | | |
|---|---|---|---|---|---|---|---|
| (E) Rnd Col | (H) Ct Vec | (J) Wht Vec | (O) Wht Sig | (P) Smth WSig | (Q) Seg # | (R) Seg Mass | (S) WhSeg Cntrd |
| 0 | 1 | 0 | 0.0 | 0.0 | | | 0 |
| 1 | 1 | 0 | 0.0 | 0.5 | | | 0 |
| 2 | 1 | 2 | 2.0 | 1.5 | 1 | 4.0 | 0* |
| 3 | 1 | 2 | 2.0 | 1.5 | | | 0 |
| 4 | 2 | 0 | 0.0 | 0.5 | | | 0 |
| 5 | 2 | 0 | 0.0 | 0.0 | — | | 0 |
| 6 | 2 | 0 | 0.0 | 0.0 | | | 0 |
| 7 | 2 | 0 | 0.0 | 0.2 | | | 0 |
| 8 | 3 | 2 | 0.7 | 0.5 | | | 0 |
| 9 | 3 | 2 | 0.7 | 0.7 | 2 | 2.2 | 0* |
| 10 | 3 | 2 | 0.7 | 0.5 | | | 0 |
| 11 | 3 | 0 | 0.0 | 0.2 | | | 0 |
| 12 | 3 | 0 | 0.0 | 0.1 | — | | 0 |
| 13 | 3 | 1 | 0.3 | 0.2 | 3 | 0.6 | 0* |
| 14 | 3 | 1 | 0.3 | 0.2 | | | 0 |
| 15 | 3 | 0 | 0.0 | 0.1 | — | | 0 |
| 16 | 3 | 0 | 0.0 | 1.2 | | | 0 |
| 17 | 3 | 14 | 4.7 | 3.5 | | | 0 |
| 18 | 3 | 14 | 4.7 | 5.5 | | | 0 |
| 19 | 3 | 23 | 7.7 | 7.0 | 4 | 29.1 | 1 |
| 20 | 3 | 23 | 7.7 | 6.2 | | | 0 |
| 21 | 2 | 3 | 1.5 | 3.1 | | | 0 |

TABLE VII-continued

Processing Whitening Gradient.

| (E) Rnd Col | (H) Ct Vec | (J) Wht Vec | (O) Wht Sig | (P) Smth WSig | (Q) Seg # | (R) Seg Mass | (S) WhSeg Cntrd |
|---|---|---|---|---|---|---|---|
| 22 | 2 | 3 | 1.5 | 1.4 | | | 0 |
| 23 | 2 | 2 | 1.0 | 1.1 | — | | 0 |
| 24 | 2 | 2 | 1.0 | 1.5 | | | 0 |
| 25 | 1 | 3 | 3.0 | 2.5 | | | 0 |
| 26 | 1 | 3 | 3.0 | 3.0 | 5 | 11.2 | 0* |
| 27 | 1 | 3 | 3.0 | 2.3 | | | 0 |
| 28 | 1 | 0 | 0.0 | 0.8 | | | 0 |
| 29 | 1 | 0 | 0.0 | 0.0 | — | | 0 |

KEY
(O): Normalized whitening gradient signal = whitening gradient vector/count vector
(P): Smoothed whitening gradient signal (previous pixel + (2 × pixel) + next pixel)/4
(Q): Segment number
(R): Segment mass
(S): Weighted centroid of whitening gradient segment
*segment rejected because of low mass

TABLE VIII

Processing Blackening Gradient.

| (E) Rnd Col | (H) Ct Vec | (J) Wht Vec | (T) Blk Sig | (U) Smth BSig | (V) Seg # | (W) Seg Mass | (X) BlSeg Cntrd |
|---|---|---|---|---|---|---|---|
| 0 | 1 | 0 | 0.0 | 0.0 | — | | 0 |
| 1 | 1 | 0 | 0.0 | 0.0 | | | 0 |
| 2 | 1 | 0 | 0.0 | 0.0 | | | 0 |
| 3 | 1 | 0 | 0.0 | 0.1 | | | 0 |
| 4 | 2 | 1 | 0.5 | 0.4 | | | 0 |
| 5 | 2 | 1 | 0.5 | 0.6 | | | 0 |
| 6 | 2 | 2 | 1.0 | 0.9 | 1 | 3.1 | 0* |
| 7 | 2 | 2 | 1.0 | 0.8 | | | 0 |
| 8 | 3 | 0 | 0.0 | 0.3 | | | 0 |
| 9 | 3 | 0 | 0.0 | 0.0 | — | | 0 |
| 10 | 3 | 0 | 0.0 | 2.0 | | | 0 |
| 11 | 3 | 24 | 8.0 | 6.0 | | | 0 |
| 12 | 3 | 24 | 8.0 | 9.0 | | | 0 |
| 13 | 3 | 36 | 12.0 | 11.0 | 2 | 45.1 | 1 |
| 14 | 3 | 36 | 12.0 | 10.0 | | | 0 |
| 15 | 3 | 6 | 2.0 | 4.5 | | | 0 |
| 16 | 3 | 6 | 2.0 | 1.6 | | | 0 |
| 17 | 3 | 1 | 0.3 | 0.7 | | | 0 |
| 18 | 3 | 1 | 0.3 | 0.2 | | | 0 |
| 19 | 3 | 0 | 0.0 | 0.1 | — | | 0 |
| 20 | 3 | 0 | 0.0 | 0.3 | | | 0 |
| 21 | 2 | 2 | 1.0 | 0.8 | | | 0 |
| 22 | 2 | 2 | 1.0 | 0.9 | 3 | 3.2 | 0* |
| 23 | 2 | 1 | 0.5 | 0.6 | | | 0 |
| 24 | 2 | 1 | 0.5 | 0.4 | | | 0 |
| 25 | 1 | 0 | 0.0 | 0.1 | | | 0 |
| 26 | 1 | 0 | 0.0 | 0.0 | — | | 0 |
| 27 | 1 | 0 | 0.0 | 3.8 | | | 0 |
| 28 | 1 | 15 | 15.0 | 11.3 | 4 | 26.4 | 1 |
| 29 | 1 | 15 | 15.0 | 11.3 | | | 0 |

KEY
(T): Normalized blackening gradient signal = blackening gradient vector/count vector
(U): Smoothed normalized blackening gradient signal = (previous pixel + (2 × pixel) + next pixel)/4
(V): Segment number
(W): Segment mass
(X): Weighted centroid of blackening gradient segment
*segment rejected because of low mass After means 1510 normalizes the gradient vectors, means 1512 smoothes the resulting whitening and blackening gradient signals. The smoothing filter employed by means 1512 preferably depends on the oversampling rate used to stretch the scan line data. Table IX presents the preferred filter parameters for different oversampling rates.

TABLE IX

| Oversampling Rate | Filter size | Weights |
|---|---|---|
| 1, 2 | 1 | 1 |
| 3, 4 | 3 | 1, 2, 1 |
| 5, 6 | 5 | 1, 2, 4, 2, 1 |
| >=7 | 7 | 1, 2, 4, 8, 4, 2, 1 |

List (P) of Table VII presents the results of smoothing the whitening gradient signal of list (O) based on an oversampling rate of 3. For an oversampling rate of 3, each element $S_i$ in the smoothed whitening gradient signal of list (P) is calculated using:

$$S_i = \frac{W_{i-1} + 2W_i + W_{i+1}}{4}, \qquad (3)$$

where $W_i$ is the element in the whitening gradient signal of list (O) corresponding to element $S_i$, $W_{i-1}$ is the previous element in list (O), and $W_{i+1}$ is the next element in list (O). Similarly, list (U) of Table VIII presents the results of smoothing the blackening gradient signal of list (T) based on an oversampling rate of 3.

After means 1512 smoothes the two gradient signals, means 1514 transmits the smoothed gradient signals to gradient signal processor 114 of system 100. Those skilled in the art will understand that the smoothing of means 1512 is an optional processing step.

Processing and Decoding the Smoothed Gradient Signals

Referring now to FIG. 16, there is shown a block flow diagram of the processing implemented by gradient signal processor 114 of system 100 to process the smoothed whitening and blackening gradient signals generated by generator 112. The whitening and blackening gradient signals represent the locations of dark-to-bright and bright-to-dark transitions, respectively, in the bar code symbol. That is, they represent the trailing and leading edges, respectively, of bars in the bar code symbol. Processor 114 locates the bright/dark transitions in the gradient signals and generates a single one-dimensional reconstructed signal from those transition locations. Processor 114 transmits this reconstructed signal to gradient signal decoder 116, which decodes the signal using conventional bar code decoding methods.

In a preferred embodiment, processor 114 segments the two gradient signals, locates the centroids of the signal segments, and reconstructs a single binary signal from the centroid locations. In an alternative preferred embodiment (not shown), processor 114 selects the peaks in the two gradient signals as the locations of the transitions for the reconstructed signal.

Means 1602 of FIG. 16 receives the smoothed whitening and blackening gradient signals from generator 112 and segments them into individual segments. Each segment begins with a local minimum in the gradient signal and ends with the next local minimum. Each segment, therefore, contains a single local maximum. Referring again to Table VII, list (Q) identifies the segments in the smoothed whitening gradient signal of list (P). Similarly, list (V) of Table VIII identifies the segments in the smoothed blackening gradient signal of list (U).

To minimize erroneous segmentation, means 1602 preferably uses a significance-value test to determine the local minima that define the segments in the gradient signals, where the significance-value test is similar to that described earlier in this specification in conjunction with FIG. 11.

After means 1602 segments the smoothed gradient signals, means 1604 determines the mass of each segment. The mass of each segment is the sum of the smoothed gradient values for that segment. List (R) of Table VII presents the masses of the whitening gradient segments identified in list (Q). Similarly, list (W) of Table VIII presents the masses of the blackening gradient segments identified in list (V). Thus, for example, segment #3 in Table VII has a mass of (0.1+0.2+0.2+0.1) or 0.6.

After means 1604 determines the mass of each segment, means 1606 locates the weighted centroid of those segments that have sufficient mass. Means 1606 ignores those segments whose masses are less than a specified mass threshold, indicating that they have insufficient mass. The mass threshold is preferably specified to be equivalent to a fraction, for example, one-eighth, of the product of the oversampling rate and the expected mass of a narrow bar or space in the original pixel image.

Noise in the pixel image may result in spurious segments in the gradient signals. If the image noise is not too great, the spurious segments will have masses typically lower than the masses of true segments (i.e., those corresponding to true bright/dark transitions in the pixel image). In that case, means 1606 may be used to "filter" out the spurious segments.

In Table VII, segments #1, 2, 3, and 5 are rejected for having masses less than the specified mass threshold of 20. Segments #1 and 3 of Table VIII are also rejected for similarly having masses less than the mass threshold.

After eliminating the segments having low mass, means 1606 locates the weighted centroids of the remaining segments. The weighted centroid of a segment is the location within the segment corresponding to a specified percentage of the mass of the segment. For example, a weighted centroid based on 50% corresponds to the center of mass of each segment. A weighted centroid based on 40% corresponds to the location within the segment wherein 40% of the mass is to the left and 60% of the mass is to the right.

In Table VII, a "1" in list (S) identifies the location of the weighted centroid of segment #4, where 50% is the selected weighted-centroid percentage. Similarly, list (X) of Table VIII identifies the locations of the weighted centroids of segments #2 and 4.

In an alternative preferred embodiment (not shown), different weighted-centroid percentages are used to locate the centroids in the whitening and blackening gradient segments. Since black bars tend to "bleed" into white spaces in bar code symbol images, bars tend to appear wider and spaces narrower in the images. Using a whitening-centroid percentage that is smaller than the blackening-centroid percentage may correct these bleeding effects. The exact weighted-centroid percentages may be selected empirically based on tests performed on images of known bar code symbols.

After means 1606 locates the whitening and blackening segment centroids, means 1608 reconstructs a single one-dimensional signal by interleaving the centroid locations from the two gradient signals. The centroid of each segment from the smoothed blackening gradient signal corresponds to the leading edge of a bar in the bar code symbol. Similarly, the centroid of each segment from the smoothed whitening gradient signal corresponds to the trailing edge of a bar in the bar code symbol.

Table X presents the results of means 1608 interleaving the whitening and blackening segment centroids of Tables VII and VIII. Lists (E), (S), and (X) of Table X are identical to the corresponding lists of Tables VII and VIII. List (Y) of Table X represents the one-dimensional reconstructed signal generated by means 1608. Note that the reconstructed signal of list (Y) of Table X is identical to the thresholded signal of list (N) of Table VI, indicating that the gradient signal processing of generator 112 and processor 114 of system 100 generates the same result as the composite signal processing generator 900 and thresholder 108 of system 100.

TABLE X

Reconstructing Segmented Signal.

| (E) Rnd Col | (S) WhSeg Cntrd | (X) BlSeg Cntrd | (Y) Rec Sig. |
|---|---|---|---|
| 0 | 0 | 0 | 1 |
| 1 | 0 | 0 | 1 |
| 2 | 0 | 0 | 1 |
| 3 | 0 | 0 | 1 |
| 4 | 0 | 0 | 1 |
| 5 | 0 | 0 | 1 |
| 6 | 0 | 0 | 1 |
| 7 | 0 | 0 | 1 |
| 8 | 0 | 0 | 1 |
| 9 | 0 | 0 | 1 |
| 10 | 0 | 0 | 1 |
| 11 | 0 | 0 | 1 |
| 12 | 0 | 0 | 1 |
| 13 | 0 | 1 | 0 |
| 14 | 0 | 0 | 0 |
| 15 | 0 | 0 | 0 |
| 16 | 0 | 0 | 0 |
| 17 | 0 | 0 | 0 |
| 18 | 0 | 0 | 0 |
| 19 | 1 | 0 | 1 |
| 20 | 0 | 0 | 1 |
| 21 | 0 | 0 | 1 |
| 22 | 0 | 0 | 1 |
| 23 | 0 | 0 | 1 |
| 24 | 0 | 0 | 1 |
| 25 | 0 | 0 | 1 |
| 26 | 0 | 0 | 1 |
| 27 | 0 | 0 | 1 |
| 28 | 0 | 1 | 0 |
| 29 | 0 | 0 | 0 |

KEY
(Y): Reconstructed signal

If the reconstructed signal has two consecutive leading bar edges, then either a trailing bar edge was missed or an extra leading bar edge was inserted. Similarly, if the reconstructed signal has two consecutive trailing bar edges, then either a bar leading edge was missed or an extra bar trailing edge was inserted. If true, bar edges are being missed, then the segmentation procedure performed by means 1602 should be made more sensitive to smaller gradients. If spurious bar edges are being inserted, then the segmentation procedure should be made less sensitive to accommodate larger changes in the gradient signal without falsely splitting a segment in two. The sensitivity of the segmentation procedure may be controlled by varying the specified mass threshold used by means 1606 to determine whether segments have sufficient mass.

After means 1608 generates a reconstructed signal, means 1610 transmits the reconstructed signal to gradient signal decoder 116. In a preferred embodiment, the processing of decoder 116 is identical to that of composite signal decoder 110 described earlier in this specification in the section entitled "Decoding Composite Signals." After decoding the bar code symbol, decoder 116 transmits the decoded signal to output selector 118.

As described earlier in this specification in conjunction with the example of Table II, under a preferred embodiment of the present invention, the original pixel intensity values are repeated to "fill in the gaps" between the rounded columns that result from rotating, stretching, and rounding the original columns. In an alternative preferred embodiment (not shown), the original pixel intensity values are repeated according to the oversampling rate.

For example, referring to Table III, for an oversampling rate of three, system 100 would rotate and stretch original pixel (0,0) such that the intensity value of pixel (0,0) would be used three times to update the elements of the composite vector corresponding to rounded columns 0, 1, and 2. Similarly, system 100 would rotate and stretch original pixel (0,1) such that the intensity value of pixel (0,1) would be used three times to update the elements of the composite vector corresponding to rounded columns 2, 3, and 4.

Note that the intensity values of both original pixels (0,0) and (0,1) of scan line #1 are used to update the element of the composite vector corresponding to rounded column 2. Thus, rather than "filling in the gaps" between rounded columns, in this preferred embodiment, the original pixel values are repeated according to the oversampling rate and "overlapping" may result. In this example, the element of the count vector corresponding to rounded column 2 is updated two times to reflect this overlapping effect.

System 100 may be implemented in hardware, software, or a combination of hardware and software. In a preferred embodiment, system 100 is implemented in software running on common microprocessors such as Intel's 80X86 family or Motorola's 680X0 family.

Those skilled in the art will understand that preferred embodiments of system 100 may be designed to locate and decode bar code symbols in binary and/or gray-scale images.

Those skilled in the art will also understand that system 100 is preferably designed to be parameter-driven, where the values for various parameters may be changed depending on the particular application. It will also be understood that the selection of certain parameter values may be based on empirical analysis from processing known sample images.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for reading a bar code symbol in a pixel image, comprising the steps of:
   (a) selecting a first scan line crossing at least a first portion of said symbol;
   (b) generating a first gradient signal representative of the dark-to-bright transitions in said first portion of said symbol;
   (c) generating a second gradient signal representative of the bright-to-dark transitions in said first portion of said symbol, wherein the first gradient signal is distinct from the second gradient signal;
   (d) selecting a second scan line crossing at least a second portion of said symbol;
   (e) generating an updated first gradient signal in accordance with the dark-to-bright transitions in said second portion and the first gradient signal;
   (f) generating an updated second gradient signal in accordance with the bright-to-dark transitions in said second portion and the second gradient signal; and
   (g) decoding said symbol in accordance with said updated first and second .gradient signals.

2. The method of claim 1, wherein said first gradient signal is a whitening gradient signal and said second gradient signal is a blackening gradient signal.

3. The method of claim 1, wherein step (g) comprises the steps of:
   (1) segmenting said Updated first gradient signal into at least one first segment;
   (2) selecting a first location in said first segment corresponding to a dark-to-bright transition;
   (3) segmenting said updated second gradient signal into at least one second segment;
   (4) selecting a second location in said second segment corresponding to a bright-to-dark transition; and
   (5) decoding said symbol in accordance with said first and second locations.

4. The method of claim 3, wherein step (g)(5) comprises the steps of:
   (i) generating a reconstructed signal in accordance with said first and second locations; and
   (ii) decoding said reconstructed signal.

5. The method of claim 3, wherein said first location corresponds to a peak of said first segment.

6. The method of claim 3, wherein said first location corresponds to a weighted centroid of said first segment.

7. The method of claim 3, wherein said first segment comprises a local maximum in said updated first gradient signal.

8. The method of claim 3, wherein step (g)(1) further comprises the steps of:
   (i) determining the mass of said first segment; and
   (ii) if said mass is greater than a first mass threshold, then continuing to step (g)(2); otherwise, rejecting said first segment.

9. The method of claim 1, wherein step (g) further comprises the step of smoothing said updated first gradient signal and said updated second gradient signal.

10. An apparatus for reading a bar code symbol in a pixel image, comprising:
    (a) means for selecting a first scan line crossing at least a first portion of said symbol;
    (b) means for generating a first gradient signal representative of the dark-to-bright transitions in said first portion of said symbol;
    (c) means for generating a second gradient signal representative of the bright-to-dark transitions in said first portion of said symbol, wherein the first gradient signal is distinct from the second gradient signal;
    (d) means for selecting a second scan line crossing at least a second portion of said symbol;
    (e) means for generating an updated first gradient signal in accordance with the dark-to-bright transitions in said second portion and the first gradient signal;

(f) means for generating an updated second gradient signal in accordance with the bright-to-dark transitions in said second portion and the second gradient signal; and (g) means for decoding said symbol in accordance with said updated first and second gradient signals.

11. The apparatus of claim 10, wherein said first gradient signal is a whitening gradient signal and said second gradient signal is a blackening gradient signal.

12. The apparatus of claim 10, wherein means (g) comprises:
(1) means for segmenting said updated first gradient signal into at least one first segment;
(2) means for selecting a first location in said first segment corresponding to a dark-to-bright transition;
(3) means for segmenting said updated second gradient signal into at least one second segment;
(4) means for selecting a second location in said second segment corresponding to a bright-to-dark transition; and
(5) means for decoding said symbol in accordance with said first and second locations.

13. The apparatus of claim 12, wherein means (g)(5) comprises:
(i) means for generating a reconstructed signal in accordance with said first and second locations; and
(ii) means for decoding said reconstructed signal.

14. The apparatus of claim 12, wherein said first location corresponds to a peak of said first segment.

15. The apparatus of claim 12, wherein said first location corresponds to a weighted centroid of said first segment.

16. The apparatus of claim 12, wherein said first segment comprises a local maximum in said updated first gradient signal.

17. The apparatus of claim 12, wherein means (g)(1) further comprises:
(i) means for determining the mass of said first segment; and
(ii) means for determining whether said mass is greater than a first mass threshold and for directing processing according to said determination.

18. The apparatus of claim 10, wherein means (g) further comprises means for smoothing said updated first gradient signal and said updated second gradient signal.

19. The method of claim 1, wherein:
step (a) further comprises the step of transforming said first portion, wherein said transforming comprises the steps of rotating said first portion to an angle substantially parallel to either a row or column of pixels in said image and stretching said first portion;
step (b) comprises the step of generating said first gradient signal in accordance with said transformed first portion;
step (c) comprises the step of generating said second gradient signal in accordance with said transformed first portion;
step (d) further comprises the step of transforming said second portion, wherein said transforming comprises the steps of rotating said second portion to an angle substantially parallel to either a row or column of pixels in said image and stretching said second portion;

step (e) comprises the step of generating said updated first gradient signal in accordance with said transformed second portion and the first gradient signal; and
step (f) comprises the step of generating said updated second gradient signal in accordance with said transformed second portion and the second gradient signal.

20. The method of claim 19, wherein:
step (e) comprises the step of generating an element of said updated first gradient signal by adding a value corresponding to said transformed first portion and a value corresponding to said transformed second portion; and
step (f) comprises the step of generating an element of said updated second gradient signal by adding a value corresponding to said transformed first portion and a value corresponding to said transformed second portion.

21. The method of claim 19, further comprising the steps of:
(h) generating a count vector in accordance with said transformed first portion; and
(i) incrementing said count vector in accordance with said transformed second portion, wherein:
step (g) comprises the step of decoding said symbol in accordance with said updated first and second gradient signals and said count vector.

22. The method of claim 21, wherein step (g) comprises the steps of:
(1) normalizing said updated first gradient signal by dividing an element of said updated first gradient signal by a corresponding element of said count vector; and
(2) normalizing said updated second gradient signal by dividing an element of said updated second gradient signal by a corresponding element of said count vector.

23. The method of claim 1, wherein:
step (e) comprises the step of generating an element of said updated first gradient signal by adding a value corresponding to said first portion and a value corresponding to said second portion; and
step (f) comprises the step of generating an element of said updated second gradient signal by adding a value corresponding to said first portion and a value corresponding to said second portion.

24. The method of claim 1, further comprising the steps of:
(h) generating a count vector in accordance with said first portion; and
(i) incrementing said count vector in accordance with said second portion, wherein:
step (g) comprises the step of decoding said symbol in accordance with said updated first and second gradient signals and said count vector.

25. The method of claim 24, wherein step (g) comprises the steps of:
(1) normalizing said updated first gradient signal by dividing an element of said updated first gradient signal by a corresponding element of said count vector; and
(2) normalizing said updated second gradient signal by dividing an element of said updated second gradient signal by a corresponding element of said count vector.

26. The method of claim 1, wherein said pixel image is a gray-scale image.

27. The method of claim 1, further comprising the step of:
 (h) transforming said symbol, wherein said transforming comprises the steps of rotating said symbol to an angle substantially parallel to either a row or column of pixels in said image and stretching said symbol, wherein:
 step (a) comprises the step of selecting said first scan line crossing said transformed symbol;
 step (b) comprises the step of generating said first gradient signal in accordance with the dark-to-bright transitions along said first scan line;
 step (c) comprises the step of generating said second gradient signal in accordance with the bright-to-dark transitions along said first scan line;
 step (d) comprises the step of selecting said second scan line crossing said transformed symbol;
 step (e) comprises the step of generating said updated first gradient signal in accordance with the dark-to-bright transitions along said second scan line and the first gradient signal; and
 step (f) comprises the step of generating said updated second gradient signal in accordance with the bright-to-dark transitions along said second scan line and the second gradient signal.

28. The apparatus of claim 10, wherein:
 means (a) further comprises means for transforming said first portion, wherein said transforming means comprises means for rotating said first portion to an angle substantially parallel to either a row or column of pixels in said image and stretching said first portion;
 means (b) comprises means for generating said first gradient signal in accordance with said transformed first portion;
 means (c) comprises means for generating said second gradient signal in accordance with said transformed first portion;
 means (d) further comprises means for transforming said second portion, wherein said transforming means comprises means for rotating said second portion to an angle substantially parallel to either a row or column of pixels in said image and stretching said second portion;
 means (e) comprises means for generating said updated first gradient signal in accordance with said transformed second portion and the first gradient signal; and
 means (f) comprises means for generating said updated second gradient signal in accordance with said transformed second portion and the second gradient signal.

29. The apparatus of claim 28, wherein:
 means (e) comprises means for generating an element of said updated first gradient signal by adding a value corresponding to said transformed first portion and a value corresponding to said transformed second portion; and
 means (f) comprises means for generating an element of said updated second gradient signal by adding a value corresponding to said transformed first portion and a value corresponding to said transformed second portion.

30. The apparatus of claim 28, further comprising:
 (h) means for generating a count vector in accordance with said transformed first portion; and
 (i) means for incrementing said count vector in accordance with said transformed second portion, wherein:
 means (g) comprises means for decoding said symbol in accordance with said updated first and second gradient signals and said count vector.

31. The apparatus of claim 30, wherein means (g) comprises:
 (1) means for normalizing said updated first gradient signal by dividing an element of said updated first gradient signal by a corresponding element of said count vector; and
 (2) means for normalizing said updated second gradient signal by dividing an element of said updated second gradient signal by a corresponding element of said count vector.

32. The apparatus of claim 10, wherein:
 means (e) comprises means for generating an element of said updated first gradient signal by adding a value corresponding to said first portion and a value corresponding to said second portion; and
 means (f) comprises means for generating an element of said updated second gradient signal by adding a value corresponding to said first-portion and a value corresponding to said second portion.

33. The apparatus of claim 10, further comprising:
 (h) means for generating a count vector in accordance with said first portion; and
 (i) means for incrementing said count vector in accordance with said second portion, wherein:
 means (g) comprises means for decoding said symbol in accordance with said updated first and second gradient signals and said count vector.

34. The apparatus of claim 33, wherein means (g) comprises:
 (1) means for normalizing said updated first gradient signal by dividing an element of said updated first gradient signal by a corresponding element of said count vector; and
 (2) means for normalizing said updated second gradient signal by dividing an element of said updated second gradient signal by a corresponding element of said count vector.

35. The apparatus of claim 10, wherein said pixel image is a gray-scale image.

36. The apparatus of claim 10, further comprising:
 (h) means for transforming said symbol, wherein said transforming means comprises means for rotating said symbol to an angle substantially parallel to either a row or column of pixels in said image and stretching said symbol, wherein:
 means (a) comprises means for selecting said first scan line crossing said transformed symbol;
 means (b) comprises means for generating said first gradient signal in accordance with the dark-to-bright transitions along said first scan line;
 means (c) comprises means for generating said second gradient signal in accordance with the bright-to-dark transitions along said first scan line;
 means (d) comprises means for selecting said second scan line crossing said transformed symbol;
 means (e) comprises means for generating said updated first gradient signal in accordance with the dark-to-bright transitions along said second scan line and the first gradient signal; and
 means (f) comprises means for generating said updated second gradient signal in accordance with the bright-to-dark transitions along said second scan line and the second gradient signal.

* * * * *